United States Patent
Andrews et al.

(10) Patent No.: US 6,797,751 B2
(45) Date of Patent: Sep. 28, 2004

(54) METHOD OF CONTENT PROTECTION WITH DURABLE UV ABSORBERS

(75) Inventors: Stephen Mark Andrews, New Fairfield, CT (US); Joseph Suhadolnik, Yorktown Heights, NY (US); Mervin Gale Wood, Poughquag, NY (US)

(73) Assignee: Ciba Specialty Chemicals Corporation, Tarrytown, NY (US)

( * ) Notice: Subject to any disclaimer, the term of this patent is extended or adjusted under 35 U.S.C. 154(b) by 0 days.

(21) Appl. No.: 10/323,238

(22) Filed: Dec. 18, 2002

(65) Prior Publication Data

US 2003/0144389 A1 Jul. 31, 2003

Related U.S. Application Data

(62) Division of application No. 09/772,245, filed on Jan. 29, 2001, now abandoned.
(60) Provisional application No. 60/179,567, filed on Feb. 1, 2000.

(51) Int. Cl.[7] .................. C08K 5/3475; B32B 27/08; B65D 85/00
(52) U.S. Cl. .................. 524/94; 524/89; 524/91; 428/35.7; 428/480; 428/500; 206/524.4; 206/525
(58) Field of Search .................. 524/94, 89, 91; 428/35.7, 480, 500; 206/524.4, 525

(56) References Cited

U.S. PATENT DOCUMENTS

| | | | |
|---|---|---|---|
| 3,004,896 A | 10/1961 | Heller et al. .................. 167/90 |
| 3,055,896 A | 9/1962 | Boyle et al. .................. 260/249.5 |
| 3,072,585 A | 1/1963 | Milionis et al. .................. 260/22 |
| 3,074,910 A | 1/1963 | Dickson .................. 260/45.75 |
| 3,189,615 A | 6/1965 | Heller et al. .................. 260/308 |
| 3,218,332 A | 11/1965 | Heller et al. .................. 260/308 |
| 3,230,194 A | 1/1966 | Boyle .................. 260/45.8 |
| 3,843,371 A | 10/1974 | Piller et al. .................. 96/84 |
| 4,127,586 A | 11/1978 | Rody et al. .................. 260/308 |
| 4,226,763 A | 10/1980 | Dexter et al. .................. 260/45.8 |
| 4,278,589 A | 7/1981 | Dexter et al. .................. 260/45.8 |
| 4,315,848 A | 2/1982 | Dexter et al. .................. 260/45.8 |
| 4,383,863 A | 5/1983 | Dexter et al. .................. 106/125 |
| 4,619,956 A | 10/1986 | Susi .................. 524/87 |
| 4,675,352 A | 6/1987 | Winter et al. .................. 524/91 |
| 4,681,905 A | 7/1987 | Kubota et al. .................. 524/91 |
| 4,740,542 A | 4/1988 | Susi .................. 524/87 |
| 4,826,978 A | 5/1989 | Migdal et al. .................. 544/216 |
| 4,853,471 A | 8/1989 | Rody et al. .................. 548/261 |
| 4,882,412 A | 11/1989 | Weaver et al. .................. 528/190 |
| 4,891,396 A * | 1/1990 | Avar et al. .................. 524/91 |
| 4,892,923 A | 1/1990 | Weaver et al. .................. 528/190 |
| 4,950,732 A | 8/1990 | Weaver et al. .................. 528/288 |
| 5,096,489 A | 3/1992 | Laver .................. 106/20 |
| 5,106,891 A | 4/1992 | Valet .................. 524/91 |
| 5,226,538 A | 7/1993 | Roselle .................. 206/459.1 |
| 5,268,450 A | 12/1993 | DesLauriers et al. .................. 528/388 |
| 5,280,124 A | 1/1994 | Winter et al. .................. 548/259 |
| 5,319,091 A | 6/1994 | DesLauriers et al. .................. 548/259 |
| 5,354,794 A | 10/1994 | Stevenson et al. .................. 524/100 |
| 5,410,071 A | 4/1995 | DesLauriers et al. .................. 548/259 |
| 5,556,973 A | 9/1996 | Stevenson et al. .................. 544/216 |
| 5,574,166 A | 11/1996 | Winter et al. .................. 548/260 |
| 5,597,854 A * | 1/1997 | Birbaum et al. .................. 524/100 |
| 5,681,955 A | 10/1997 | Stevenson .................. 544/216 |
| 5,726,309 A | 3/1998 | Stevenson et al. .................. 544/216 |
| 5,948,458 A | 9/1999 | Swartz et al. .................. 426/321 |
| 5,977,219 A | 11/1999 | Ravichandran et al. .................. 524/91 |
| 6,166,218 A | 12/2000 | Ravichandran et al. .................. 548/257 |

FOREIGN PATENT DOCUMENTS

| | | |
|---|---|---|
| EP | 0420687 | 4/1991 |
| EP | 0941989 | 9/1999 |
| EP | 1038912 | 9/2000 |
| GB | 2317174 | 3/1998 |
| GB | 2317893 | 4/1998 |
| JP | 4352228 | 12/1992 |
| WO | 96/28431 | 9/1996 |
| WO | 99/23196 | 5/1999 |
| WO | 99/53008 | 10/1999 |
| WO | 00/27914 | 5/2000 |
| WO | 00/43318 | 7/2000 |
| WO | 00/66675 | 11/2000 |
| WO | 00/66676 | 11/2000 |

OTHER PUBLICATIONS

M. A. Pascall et al., Journal of Food Science, vol. 60, No. 5, (1995), pp. 1116–1119.
Packaging World, "Tropicana Twists Again", Jan. 1999, p. 2.
Fanelli et al., J. Food Protection, vol. 48, No. 2, pp. 112–117.

* cited by examiner

Primary Examiner—Tae H. Yoon
(74) Attorney, Agent, or Firm—Tyler A. Stevenson

(57) ABSTRACT

The contents of clear or lightly colored plastic containers or films are protected from ultraviolet radiation by the incorporation of certain UV absorbers of the class of durable benzotriazoles and tris-aryl-s-triazines in the container or film. Contents to be protected include foodstuffs, beverages, pharmaceuticals, cosmetics, personal care products, shampoos and the like.

17 Claims, No Drawings

METHOD OF CONTENT PROTECTION WITH DURABLE UV ABSORBERS

This application is a divisional of application Ser. No. 09/772,245, filed Jan. 29, 2001 abandoned, which claims the benefit under 35 USC 119(e) of U.S. Provisional Application Ser. No. 60/179,567 filed on Feb. 1, 2000.

The present invention relates to the protection of foodstuffs, beverages, pharmaceuticals, cosmetics, personal care products, shampoos and the like from the deleterious effects of ultraviolet radiation. It has been found that certain highly durable benzotriazoles and tris-aryl-s-triazines are especially effective towards this end when incorporated in the containers or films in which such materials are stored.

Many products such as certain fruit juices, soft drinks, beer, wines, food products, dairy products, cosmetics, shampoos, vitamins and pharmaceuticals are deleteriously affected, i.e. degraded, by the effects of ultraviolet (UV) light when packaged in plastic containers which allow the transmission of such light.

The use of UV absorbers towards protecting bottle and film contents is well known. However there is a trend towards the use of clear or lightly colored containers. More aesthetically pleasing containers may be formed from clear plastics which also allow one to view the contents. Unfortunately, clear and lightly colored containers and films allow the transmission of significant portions of ultraviolet light, i.e. light in the range of about 280 to about 400 nm. Further, there is a trend towards more light-weight and hence thinner walled containers. Thin-walled containers, by virtue of a shorter path length, will allow more UV light to pass. Due to these trends in packaging there is a need for more efficient UV absorbers for use in this area. UV absorber efficiency is a function of how strongly the molecule absorbs light across the entire UV region as well as its thermal and photostability, i.e. durability.

Many cooking oils and salad oils are now offered in clear PET [poly(ethylene terephthalate)] packaging. Practically all vegetable or seed-based oils such as soybean, olive, safflower, cottonseed and corn oils contain varying levels of unsaturated olefinic acids or esters (e.g. linoleates) which are susceptible to light-induced degradation. Most plant based oils also contain natural chlorophyll or other pigment photosensitizers. Pascall, et al., *J. Food Sci.*, 60 (5), 1116 (1995), discuss the UV protection of soybean oil with the use of Tinuvin® 326 incorporated into coextruded, multi-layered, polypropylene-based containers. Tinuvin® 326 is a benzotriazole UV absorber, 5-chloro-2-(2-hydroxy-3-tert-butyl-5-methylphenyl)-2H-benzotriazole, available from Ciba Specialty Chemicals Corp.

Milk is packaged in translucent or white pigmented HDPE bottles to reduce the amount of light transmission through the plastic. Fanelli, et al., *J. Food Protection*, 48(2), 112–117 (1985) disclose that Tinuvin® 326 in HDPE packaging is effective at reducing the loss rate of Vitamin A in milk exposed to cool white fluorescent light. Protection of vitamins is also of importance in fruit juices. In "Tropicana Twists Again," Packaging World, January 1999, p.2, it is disclosed that PET bottles containing a "UV inhibitor" are used to protect the shelf life of Vitamin C in fruit drinks.

The use of Tinuvin® 234, 2-(2-hydroxy-3,5-di-α-cumyl)-2H-benzotriazole, Tinuvin® 326, 5-chloro-2-(2-hydroxy-3-tert-butyl-5-methylphenyl)-2H-benzotriazole, Tinuvin® 327, 5-chloro-2-(2-hydroxy-3,5-di-tert-butylphenyl)-2H-benzotriazole, and Tinuvin® 1577, 4,6-diphenyl-2-(4-hexyloxy-2-hydroxyphenyl)-s-triazine, in packaging for content protection is known. In particular, the combinations of Tinuvin® 234 with either Tinuvin® 327 or Tinuvin® 326 are known.

It is well known that beer is normally bottled in amber or green-tinted glass to protect it from light. A highly efficient UV absorber would allow beer to be packaged in, for example, clear PET bottles.

U.S. Pat. Nos. 4,882,412, 4,892,923 and 4,950,732 disclose the use of 7-oxy-2H-1-benzopyran-2-one, 7-oxy-2H-1-benzopyran-2-imine, 3H-naphtho[2,1-b]pyran-3-one, 3H-naphtho[2,1b]pyran-3-imine and bis-methine moieties as UV absorbing groups to protect the contents of polyester and polycarbonate containers.

U.S. Pat. No. 5,948,458 teaches the protection of foods containing unsaturated lipids and fats from spoilage due to exposure to UV radiation by incorporation of calcium phosphate compounds either directly into the food product itself or in the food coatings and package wrap.

It has been found that certain UV absorbers of the class of durable benzotriazoles and tris-aryl-s-triazines are especially effective towards protecting the contents of clear, lightly colored and thin-walled containers and films.

The description, preparation and uses of the 2H-benzotriazole UV absorbers are described in U.S. Pat. Nos. 3,004,896; 3,055,896; 3,072,585; 3,074,910; 3,189, 615; 3,230,194; 4,127,586; 4,226,763; 4,278,589; 4,315, 848; 4,383,863; 4,675,352; 4,681,905 and 4,853,471.

U.S. Pat. Nos. 5,319,091 and 5,410,071 described the preparation of benzotriazoles substituted at the 5-position of the benzo ring with alkyl- or aryl-sulfonyl moieties. It is taught in U.S. Pat. No. 5,280,124 that by introducing a higher alkyl or aryl sulfoxide or sulfone at the 5-position of the benzo ring of the benzotriazole, the resulting benzotriazole exhibits enhanced absorption in the near visible range (over 350 nm). Such sulfone substituted products were shown to be useful in automotive coatings applications. U.S. Pat. Nos. 5,977,219 and 6,166,218 teach that an electron withdrawing moiety at the 5-position of the benzo ring of the benzotriazole is advantageous for similar reasons. Additionally, this patent and copending application teach that such an electron withdrawing group dramatically increases the photostability of these benzotriazole UV absorbers in automotive coatings. U.S. Pat. No. 5,574,166 teaches that benzotriazoles with a cumyl group ortho to the phenol are especially thermally stable. Surprisingly, these highly durable benzotriazoles are especially well-suited for the instant applications.

U.S. Pat. No. 3,218,332 discloses benzotriazoles substituted at the 5-position of the benzo ring by a lower alkyl sulfonyl moiety. U.S. Pat. Nos. 5,268,450 and 5,319,091 disclose polymer compositions and a process for the production of substituted aryl thio and aryl sulfonyl benzotriazoles which are covalently bound to polymers, such as poly(phenylene sulfide), RYTON®, Phillips Petroleum. U.S. Pat. No. 5,280,124 discloses benzotriazoles with only higher alkyl or aryl sulfinyl or sulfonyl moieties at the 5-position of the benzo ring which are useful for protecting thermoset automotive coatings. U.S. Pat. No. 5,977,219 and the copending patent application mentioned above teach the use of certain electron withdrawing groups including some sulfonyl groups at the 5-position of the benzo ring for the stabilization of automotive coatings.

Japanese Patent No. 92-352228 discloses the use of 5-ethylsulfonyl benzotriazoles with the 3-position of the phenyl ring being unsubstituted or substituted by methyl for the UV protection of dust proof poly(vinyl chloride) resin films.

Copending application Ser. No. 09/303,583 teaches the use of this class of UV absorbers in adhesive compositions suitable for use as an adhesive layer in a laminated article or multi-layer construction. The laminated articles include solar control films, films and glazings, UV absorbing glasses and glass coatings, optical films and the like. The protection of interior structures, textiles and fabrics from UV induced photodegradation such as in automotive applications is discussed.

The description, preparation and uses of the s-triazine UV absorbers are described for automotive coatings, photographic application, polymeric film coatings and ink jet printing. Automotive coatings are described in British 2,317, 174A and 2,317,893A and in U.S. Pat. Nos. 5,354,794; 5,556,973; 5,681,955; 5,726,309 and 5,106,891. Photographic applications are disclosed in U.S. Pat. No. 3,843,371 and copending application Ser. No. 08/974,263. Polymeric film coatings are described in U.S. Pat. Nos. 4,619,956 and 4,740,542. Ink jet printing is disclosed in U.S. Pat. No. 5,096,489. Tris-aryl-s-triazines with high molar absorption are described in copending application Ser. No. 09/383,163. From each of these patents, the s-triazine UV absorbers are revealed as very photostable.

The s-triazine UV absorbers can be prepared by the general synthetic procedures outlined in U.S. Pat. Nos. 5,726,309; 5,681,955 and 5,556,973; British 2,317,714A, WO 96/28431 and EP 941989A2.

It is known in the art that the concomitant use of a hindered amine light stabilizer with a UV absorbers such as benzotriazoles and s-triazines provide excellent stabilization in many polymer compositions as summarized by G. Bemer and M. Rembold, "New Light Stabilizers for High Solids Coatings", Organic Coatings and Science and Technology, Vol. 6, Dekkar, N.Y., pp 55–85.

DETAILED DISCLOSURE

The instant invention pertains to plastic containers or films for content storage which protect the contents therein against the deleterious effects of ultraviolet radiation which comprise (a) a clear or lightly colored plastic, and (b) an effective stabilizing amount of one or more compounds selected from the group consisting of durable hydroxyphenyl benzotriazole and tris-aryl-s-triazine UV absorbers.

The instant invention also pertains to a method of protecting contents from the deleterious effects of ultraviolet radiation which comprises storage in the clear or lightly colored containers or films of the instant invention.

Where the plastic of component (a) is lightly colored it is colored with pigments and/or dyes. Plastic containers and films made therefrom transmit significant portions of radiation of the ultraviolet region, i.e. about 280 to about 400 nm. Ultraviolet absorbers (UVA's) that are red-shifted absorb radiation towards the 400 nm region of the spectrum more efficiently than UVA's that are not red-shifted. Many of the present benzotriazloes and s-triazines, in addition to being highly durable, are also red-shifted.

The clear or lightly colored plastic of component (a) contains an upper limit of about 5% pigments and/or dyes by weight, in total, based on the weight of the plastic. Preferably, the plastic of component (a) contains an upper limit of about 2% by weight pigments and/or dyes based on the weight of the plastic. Most preferably the upper limit of pigments and/or dyes in the plastic is about 1% by weight.

The UV absorbers of component (b) exhibit excellent compatibility with the plastic containers or films of this invention. Further, they add little or no color to finished plastic containers or films.

The contents to be protected by the compositions and methods of the instant invention include foodstuffs such as fruit juices, soft drinks, beer, wines, food products and dairy products, and personal care products, cosmetics, shampoos, vitamins, pharmaceuticals, inks, dyes and pigments.

The plastic containers and films are rigid or flexible mono- and/or multi-layered packaging materials. The containers and films may be formed from polyesters, polyolefins, polyolefin copolymers such as ethylene-vinyl acetate, polystyrene, poly(vinyl chloride), poly(vinylidene chloride), polyamides, cellulosics, polycarbonates, ethylene-vinyl alcohol, poly(vinyl alcohol), styrene-acrylonitrile and ionomers and mixtures or multi-layers of these polymers.

Typical multi-layer constructions have two or more layer laminates, manufactured either by thermoforming, or extrusion of multi-layer flexible films, or extrusion of bottle "preforms" or "parissons" followed by subsequent blow molding of the preforms into bottles.

For both films and rigid packaging (bottles), typically the exterior layer, and innermost layer contacting the contents, are composed of polyesters such as PET or PEN [poly (ethylene naphthalate)], polypropylene, or polyethylene such as HDPE. The middle layers, often called 'barrier' or 'adhesive' or 'tie' layers, are composed of one or more combinations of either PET, PEN, carboxylated polyethylene ionomer such as Surlyn®, vinyl alcohol homopolymers or copolymers such as poly(vinyl alcohol), partially hydrolyzed poly(vinyl acetate), poly(ethylene-co-vinyl alcohol) such as EVOH or EVAL, nylons or polyamides such as Selar® (DuPont) or polyamides based on metaxylenediamine (sometimes called nylon MXD-6), or polyvinylidene chloride (PVDC), or polyurethanes. For packaging of meats and vegetables, where a controlled rate of 'respiration' or oxygen and moisture transport is desired, polystyrenes and cellulosics are used as a packaging component.

Optionally, the stabilizers of component (b) and optional further additives can be incorporated into coatings which are applied to the outer surface of e.g. rigid containers. Examples of exterior coatings include PVDC, or epoxies (such as Bairocace® technology and polyolefins used as "shrink wrap."

The containers and films are primarily polyesters such as poly(ethylene terephthalate) (PET) and polyolefins such as polyethylene or polypropylene. Preferably they comprise PET or HDPE. Where the packaging material is a multi-layer system, layers of any suitable plastic may be employed.

The polyesters which may be used in the compositions of this invention include linear, thermoplastic, crystalline or amorphous polyesters produced by conventional polymerization techniques from one or more diols and one or more dicarboxylic acids. The polyesters normally are molding grade and have an inherent viscosity (I.V.) of about 0.4 to about 1.2. The preferred polyesters comprise at least about 50 mole percent terephthalic acid residues and at least about 50 mole percent ethylene glycol and/or 1,4-cyclohexanedimethanol residues. Particularly preferred polyesters are those containing from about 75 to 100 mole percent terephthalic acid residues and from about 75 to 100 mole percent ethylene glycol residues.

The diol components of the described polyesters may be selected from ethylene glycol, 1,4-cyclohexanedimethanol, 1,2-propanediol, 1,3-propanediol, 1,4-butanediol, 2,2-dimethyl-1,3-propanediol, 1,6-hexanediol, 1,2-cyclohexanediol, 1,4-cyclohexanediol, 1,2-cyclohexanedimethanol, 1,3-cyclohexanedimethanol, X,8- bis(hydroxymethyl)-tricyclo-[5.2.1.0]-decane wherein X represents 3, 4, or 5; and diols containing one or more oxygen atoms in the chain e.g., diethylene glycol, triethylene glycol, dipropylene glycol, tripropylene glycol and the like. In general, these diols contain 2 to 18, preferably 2 to 8 carbon atoms. Cycloaliphatic diols can be employed in their cis or trans configuration or as mixtures of both forms.

The acid components (aliphatic, alicyclic, or aromatic dicarboxylic acids) of the linear polyester are selected, for example, from terephthalic acid, isophthalic acid, 1,4-cyclohexanedicarboxylic acid, 1,3-cyclohexanedicarboxylic acid, succinic acid, glutaric acid, adipic acid, sebacic acid, 1,12-dodecanedioic acid, 2,6-naphthalene-dicarboxylic acid and the like. In the polymer preparation, it is often preferable to use a functional acid derivative thereof such as the dimethyl, diethyl, or dipropyl ester of the dicarboxylic acid. The anhydrides or acid halides of these acids also may be employed where practical.

The linear polyesters may be prepared according to procedures well known in the art. For example, a mixture of one or more dicarboxylic acids, preferably aromatic dicarboxylic acids, or ester forming derivatives thereof, and one or more diols may be heated in the presence of esterification and/or poly-esterification catalysts at temperatures in the range of 150° to 300° C. and pressures of atmospheric to 0.2 mm Hg. Normally, the dicarboxylic acid or derivative thereof is esterified or transesterified with the diol(s) at atmospheric pressure and at a temperature at the lower end of the specified range. Polycondensation then is effected by increasing the temperature and lowering the pressure while excess diol is removed from the mixture. Solid state polymerization may be employed to achieve final polymer I.V. in a useful range for films and molded containers.

The novel polyester compositions provided by this invention are useful in the manufacture of containers or packages for comestibles such as beverages and food. By the use of known heat-setting techniques, certain of the polyesters are, in terms of color, I.V. and heat distortion, stable at temperatures up to about 100° C. Such stability characteristics are referred to herein as "hot-fill" stability. Articles molded from these polyesters exhibit good thin-wall rigidity, excellent clarity and good barrier properties with respect to moisture and atmospheric gases, particularly carbon dioxide and oxygen.

Rigid containers may be manufactured by known mechanical processes:
a) Single-stage blow molding such as performed on Nissei, Aoki, or Uniloy machines,
b) Two-stage, injection molding of pre-forms such as on Netstal or Husky machines, and pre-forms converted to bottles by blow molding (e.g., on Sidel, Corpoplast and Krones machines),
c) Integrated blow molding of pre-forms to bottles, such as processes conducted on Sipa, Krupp Kautex, or Husky ISB machines, and
d) Stretch blow molding (SBM) of pre-forms to bottles.

The pre-forms may be mono-layer or multi-layer in construction. The bottles may optionally be post-treated to alter the inner wall properties. Bottles may optionally be surface treated on the exterior such as by application of surface coatings. UV absorbers and other known stabilizers may be present in such added surface coatings.

The linear polyesters most preferred for use in articles having "hot-fill" stability comprise poly(ethylene terephthalate), poly(ethylene terephthalate) wherein up to 5 mole percent of the ethylene glycol residues have been replaced with residues derived from 1,4-cyclohexanedimethanol and poly(ethylene 2,6-naphthalenedicarboxylate), wherein the polyesters have been sufficiently heat set and oriented by methods well known in the art to give a desired degree of crystallinity. By definition, a polymer is "hot-fill" stable at a prescribed temperature when less than 2% change in volume of a container manufactured therefrom occurs upon filling the same with a liquid at the temperature. For the manufacture of blow-molded beverage bottles, the most preferred polyesters have an I.V. of 0.65 to 0.85, and a Tg of >70° C., and film sections cut from the bottle have a Water Vapor Transmission Rate of 1.5 to 2.5 g mils/100 in.$^2$-24 hours, a Carbon Dioxide Permeability of 20 to 30 cc. mils/100 in.$^2$-24 hours-atm., and an Oxygen Permeability of 4 to 8 cc. mils/100 in.$^2$-24 hours-atm. The Tg is determined by Differential Scanning Calorimetry at a scan rate of 20 Centigrade Degrees/min., the Oxygen Permeability by the standard operating procedure of a MOCON OXTRAN 100 instrument of Modern Controls, Inc., of Elk Riber, Minn., and the Carbon Dioxide Permeability by the standard operating procedure of a MOCON PERMATRAN C II, also of Modern Controls.

Examples for polyolefins are:

1. Polymers of monoolefins and diolefins, for example polypropylene, polyisobutylene, polybut-1-ene, poly-4-methylpent-1-ene, polyisoprene or polybutadiene, as well as polymers of cycloolefins, for instance of cyclopentene or norbornene, polyethylene (which optionally can be crosslinked), for example high density polyethylene (HDPE), high density and high molecular weight polyethylene (HDPE-HMW), high density and ultrahigh molecular weight polyethylene (HDPE-UHMW), medium density polyethylene (MDPE), low density polyethylene (LDPE), linear low density polyethylene (LLDPE), (VLDPE) and (ULDPE).

Polyolefins, i.e. the polymers of monoolefins exemplified in the preceding paragraph, preferably polyethylene and polypropylene, can be prepared by different, and especially by the following, methods:

i) radical polymerization (normally under high pressure and at elevated temperature).

ii) catalytic polymerization using a catalyst that normally contains one or more than one metal of groups IVb, Vb, VIb or VIII of the Periodic Table. These metals usually have one or more than one ligand, typically oxides, halides, alcoholates, esters, ethers, amines, alkyls, alkenyls and/or aryls that may be either p- or s-coordinated. These metal complexes may be in the free form or fixed on substrates, typically on activated magnesium chloride, titanium(III) chloride, alumina or silicon oxide. These catalysts may be soluble or insoluble in the polymerization medium. The catalysts can be used by themselves in the polymerization or further activators may be used, typically metal alkyls, metal hydrides, metal alkyl halides, metal alkyl oxides or metal alkyloxanes, said metals being elements of groups Ia, IIa and/or IIIa of the Periodic Table. The activators may be modified conveniently with further ester, ether, amine or silyl ether groups. These catalyst systems are usually termed Phillips, Standard Oil Indiana, Ziegler (-Natta), TNZ (DuPont), metallocene or single site catalysts (SSC).

2. Mixtures of the polymers mentioned under 1.), for example mixtures of polypropylene with polyisobutylene, polypropylene with polyethylene (for example PP/HDPE, PP/LDPE) and mixtures of different types of polyethylene (for example LDPE/HDPE).

3. Copolymers of monoolefins and diolefins with each other or with other vinyl monomers, for example ethylene/ propylene copolymers, linear low density polyethylene (LLDPE) and mixtures thereof with low density polyethylene (LDPE), propylene/but-1-ene copolymers, propylene/isobutylene copolymers, ethylene/but-1-ene copolymers, ethylene/hexene copolymers, ethylene/methylpentene copolymers, ethylene/heptene copolymers, ethylene/octene copolymers, propylene/butadiene copolymers, isobutylene/isoprene copolymers, ethylene/alkyl acrylate copolymers, ethylene/alkyl methacrylate copolymers, ethylene/vinyl acetate copolymers and their copolymers with carbon monoxide or ethylene/acrylic acid copolymers and their salts (ionomers) as well as terpolymers of ethylene with propylene and a diene such as hexadiene, dicyclopentadiene or ethylidene-norbornene; and mixtures of such copolymers with one another and with polymers mentioned in 1) above, for example polypropylene/ethylene-propylene copolymers, LDPE/ethylene-vinyl acetate copolymers (EVA), LDPE/ethylene-acrylic acid copolymers (EAA), LLDPE/EVA, LLDPE/EAA and alternating or random polyalkylene/carbon monoxide copolymers and mixtures thereof with other polymers, for example polyamides.

Preferred polyolefins are polyethylene or polypropylene and their copolymers with mono- and diolefins.

Particularly, the benzotriazoles of the methods of the instant invention are of formula (I), (II) or (III)

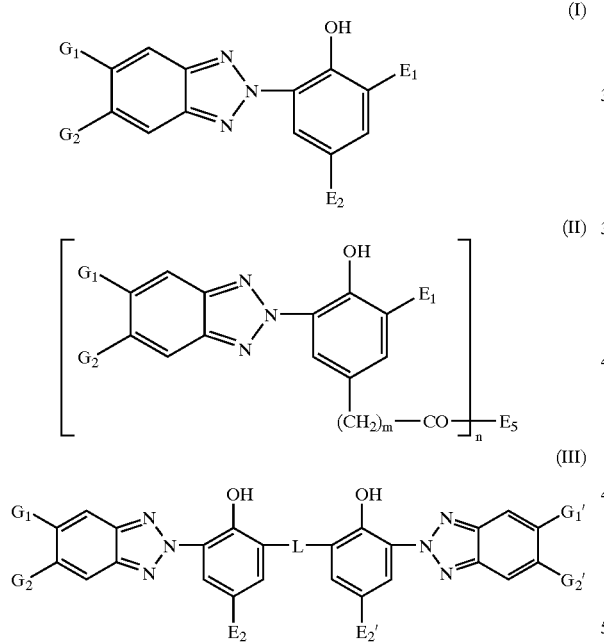

wherein $G_1$ and $G_1'$ are independently hydrogen or halogen, $G_2$ and $G_2'$ are independently halogen, nitro, cyano, perfluoroalkyl of 1 to 12 carbon atoms, —COOG$_3$, —P(O)(C$_6$H$_5$)$_2$, —CO—G$_3$, —CO—NH—G$_3$, —CO—N(G$_3$)$_2$, —N(G$_3$)—CO—G$_3$, E$_3$SO— or E$_3$SO$_2$—; or $G_2'$ is also hydrogen, $G_3$ is hydrogen, straight or branched chain alkyl of 1 to 24 carbon atoms, straight or branched chain alkenyl of 2 to 18 carbon atoms, cycloalkyl of 5 to 12 carbon atoms, phenylalkyl of 7 to 15 carbon atoms, phenyl, or said phenyl or said phenylalkyl substituted on the phenyl ring by 1 to 4 alkyl of 1 to 4 carbon atoms, $E_1$ is hydrogen, straight or branched chain alkyl of 1 to 24 carbon atoms, straight or branched chain alkenyl of 2 to 24 carbon atoms, cycloalkyl of 5 to 12 carbon atoms, phenylalkyl of 7 to 15 carbon atoms, phenyl, or said phenyl or said phenylalkyl substituted on the phenyl ring by 1 to 4 alkyl of 1 to 4 carbon atoms; or $E_1$ is alkyl of 1 to 24 carbon atoms substituted by one or two hydroxy groups, when $E_1$ is phenylalkyl of 7 to 15 carbon atoms or phenyl, or said phenyl or said phenylalkyl substituted on the phenyl ring by 1 to 4 alkyl of 1 to 4 carbon atoms, $G_2$ may also be hydrogen, $E_2$ and $E_2'$ are independently straight or branched alkyl chain of 1 to 24 carbon atoms, straight or branched chain alkenyl of 2 to 18 carbon atoms, cycloalkyl of 5 to 12 carbon atoms, phenylalkyl of 7 to 15 carbon atoms, phenyl, or said phenyl or said phenylalkyl substituted on the phenyl ring by one to three alkyl of 1 to 4 carbon atoms; or $E_2$ and $E_2'$ are independently said alkyl of 1 to 24 carbon atoms or said alkenyl of 2 to 18 carbon atoms substituted by one or more —OH, —OCOE$_{11}$, —OE$_4$, —NCO, —NH$_2$, —NHCOE$_{11}$, —NHE$_4$ or —N(E$_4$)$_2$, or mixture thereof, where $E_4$ is straight or branched chain alkyl of 1 to 24 carbon atoms; or said alkyl or said alkenyl interrupted by one or more —O—, —NH— or —NE$_4$— groups or mixtures thereof and which can be unsubstituted or substituted by one or more —OH, —OE$_4$ or —NH$_2$ groups or mixtures thereof;

n is 1 or 2, when n is 1, $E_5$ is OE$_6$ or NE$_7$E$_8$, or $E_5$ is —PO(OE$_{12}$)$_2$, —OSi(E$_{11}$)$_3$ or —OCO-E$_{11}$, or straight or branched chain C$_1$–C$_{24}$alkyl which is interrupted by —O—, —S— or —NE$_{11}$ and which can be unsubstituted or substituted by —OH or —OCO—E$_{11}$, C$_5$–C$_{12}$ cycloalkyl which is unsubstituted or substituted by —OH, straight chain or branched C$_2$–C$_{18}$alkenyl which is unsubstituted or substituted by —OH, C$_{7-C15}$aralkyl, —CH$_2$—CHOH—E$_{13}$ or glycidyl, $E_6$ is hydrogen, straight or branched chain C$_1$–C$_{24}$alkyl which is unsubstituted or substituted by one or more OH, OE$_4$ or NH$_2$ groups, or —OE$_6$ is —(OCH$_2$CH$_2$)$_w$OH or —(OCH$_2$CH$_2$)$_w$OE$_{21}$ where w is 1 to 12 and $E_{21}$ is alkyl of 1 to 12 carbon atoms, $E_7$ and $E_8$ are independently hydrogen, alkyl of 1 to 18 carbon atoms, straight or branched chain C$_3$–C$_{18}$alkyl which is interrupted by —O—, —S— or —NE$_{11}$—, C$_5$–C$_{12}$cycloalkyl, C$_6$–C$_3$hydroxylalkyl, or $E_7$ and $E_8$ together with the N atom are a pyrrolidine, piperidine, piperazine or morpholine ring, $E_5$ is —X—(Z)$_p$—Y—E$_{15}$ wherein X is —O— or —N(E$_{16}$)—, Y is —O— or —N(E$_{17}$)—, Z is C$_2$–C$_{12}$-alkylene, C$_4$–C$_{12}$-alkylene interrupted by one to three nitrogen atoms, oxygen atoms or a mixture thereof, or is C$_3$–C$_{12}$-alkylene, butenylene, butynylene, cyclohexylene or phenylene, each substituted by a hydroxyl group, m is zero, 1 or 2, p is 1, or p is also zero when X and Y are —N(E$_{16}$)— and —N(E$_{17}$)—, respectively, $E_{15}$ is a group —CO—C(E$_{18}$)=C(H)E$_{19}$ or, when Y is —N(E$_{17}$)—, forms together with E$_{17}$ a group —CO—CH=CH—CO—, wherein $E_{18}$ is hydrogen or methyl, and $E_{19}$ is hydrogen, methyl or —CO—X—E$_{20}$, wherein $E_{20}$ is hydrogen, C$_1$–C$_{12}$-alkyl or a group of the formula

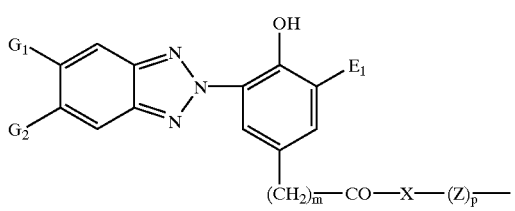

wherein the symbols $E_1$, $G_2$, X, Z, m and p have the meanings defined above, and $E_{16}$ and $E_{17}$ independently of one another are hydrogen, $C_1$–$C_{12}$-alkyl, $C_3$–$C_{12}$-alkyl interrupted by 1 to 3 oxygen atoms, or is cyclohexyl or $C_7$–$C_{15}$aralkyl, and $E_{16}$ together with $E_{17}$ in the case where Z is ethylene, also forms ethylene, when n is 2, one of $G_2$ is also hydrogen, $E_5$ is one of divalent radicals —O—$E_9$—O— or —N($E_{11}$)—$E_{10}$—N($E_{11}$)—, $E_9$ is $C_2$–$C_8$alkylene, $C_7$–$C_8$alkenylene, $C_4$alkynylene, cyclohexylene, straight or branched chain $C_7$–$C_{10}$alkylene which is interrupted by —O— or by —CH$_2$—CHOH—CH$_2$—O—$E_{14}$—O—CH$_2$—CHOH—CH$_2$—, $E_{10}$ being straight or branched chain $C_2$–$C_{12}$alkylene which may be interrupted by —O—, cyclohexylene, or

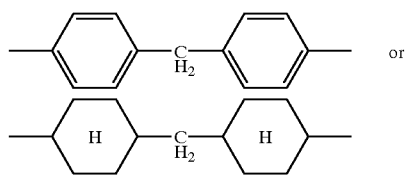

or $E_{10}$ and $E_{11}$ with the two nitrogen atoms form a piperazine ring, $E_{14}$ is straight or branched chain $C_2$–$C_8$alkylene, straight or branched chain $C_4$–$C_{10}$alkylene which is interrupted by —O—, cycloalkylene, arylene or

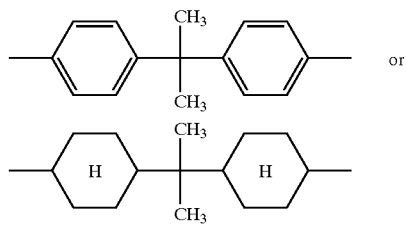

where $E_7$ and $E_8$ are independently hydrogen, alkyl of 1 to 18 carbon atoms or $E_7$ and $E_8$ together are alkylene of 4 to 6 carbon atoms, 3-oxapentamethylene, 3-iminopentamethylene or 3-methyliminopentamethylene, $E_{11}$ is hydrogen, straight or branched chain $C_1$–$C_{18}$alkyl, $C_5$–$C_{12}$cycloalkyl, straight or branched chain $C_2$–$C_{18}$alkenyl, $C_6$–$C_{14}$aryl or $C_7$–$C_{15}$aralkyl, $E_{12}$ is straight or branched chain $C_1$–$C_{18}$alkyl, straight or branched chain $C_3$–$C_{18}$alkenyl, $C_5$–$C_{10}$cycloalkyl, $C_6$–$C_{16}$aryl or $C_7$–$C_{15}$aralkyl, $E_{13}$ is H, straight chain or branched $C_1$–$C_{18}$alkyl which is substituted by —PO(O$E_{12}$)$_2$, phenyl which is unsubstituted or substituted by OH, $C_7$–$C_{15}$aralkyl or —CH$_2$O$E_{12}$, $E_3$ is alkyl of 1 to 20 carbon atoms, hydroxyalkyl of 2 to 20 carbon atoms, alkyl substituted by alkoxycarbonyl of 2 to 9 carbon atoms, alkenyl of 3 to 18 carbon atoms, cycloalkyl of 5 to 12 carbon atoms, phenylalkyl of 7 to 15 carbon atoms, aryl of 6 to 10 carbon atoms or said aryl substituted by one or two alkyl of 1 to 4 carbon atoms or 1,1,2,2-tetrahydroperfluoroalkyl where the perfluoroalkyl moiety is of 6 to 16 carbon atoms, and L is alkylene of 1 to 12 carbon atoms, alkylidene of 2 to 12 carbon atoms, benzylidene, p-xylylene, α,α,α',α'-tetramethyl-m-xylylene or cycloalkylidene; and with the proviso that formula (I) does not represent 5-chloro-2-(2-hydroxy-3,5-di-tert-butylphenyl)-2H-benzotriazole, 5-chloro-2-(2-hydroxy-3-tert-butyl-5-methylphenyl)-2H-benzotriazole or 2-(2-hydroxy-3,5-di-α-cumyl)-2H-benzotriazole.

More particularly, the compound of formula (I) is

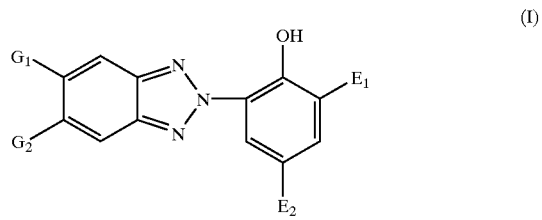

(I)

wherein $G_1$ is hydrogen, $G_2$ is hydrogen, cyano, chloro, fluoro, CF$_3$—, —CO—$G_3$, $E_3$SO— or $E_3$SO$_2$—, $G_3$ is straight or branched chain alkyl of 1 to 24 carbon atoms, straight or branched chain alkenyl of 2 to 18 carbon atoms, cycloalkyl of 5 to 12 carbon atoms, phenylalkyl of 7 to 15 carbon atoms, phenyl, or said phenyl or said phenylalkyl substituted on the phenyl ring by 1 to 4 alkyl of 1 to 4 carbon atoms, $E_1$ is phenylalkyl of 7 to 15 carbon atoms, phenyl, or said phenyl or said phenylalkyl substituted on the phenyl ring by 1 to 4 alkyl of 1 to 4 carbon atoms, $E_2$ is straight or branched alkyl chain of 1 to 24 carbon atoms, straight or branched chain alkenyl of 2 to 18 carbon atoms, cycloalkyl of 5 to 12 carbon atoms, phenylalkyl of 7 to 15 carbon atoms, phenyl, or said phenyl or said phenylalkyl substituted on the phenyl ring by 1 to 3 alkyl of 1 to 4 carbon atoms; or $E_2$ is said alkyl of 1 to 24 carbon atoms or said alkenyl of 2 to 18 carbon atoms substituted by one or more —OH, —OCO$E_{11}$, —O$E_4$, —NCO, —NH$_2$, —NHCO$E_{11}$, —NH$E_4$ or —N($E_4$)$_2$, or mixtures thereof, where $E_4$ is straight or branched chain alkyl of 1 to 24 carbon atoms; or said alkyl or said alkenyl interrupted by one or more —O—, —NH— or —N$E_4$— groups or mixtures thereof and which can be unsubstituted or substituted by one or more —OH, —O$E_4$ or —NH$_2$ groups or mixtures thereof;

$E_3$ is alkyl of 1 to 20 carbon atoms, hydroxyalkyl of 2 to 20 carbon atoms, alkenyl of 3 to 18 carbon atoms, cycloalkyl of 5 to 12 carbon atoms, phenylalkyl of 7 to 15 carbon atoms, aryl of 6 to 10 carbon atoms or said aryl substituted by one or two alkyl of 1 to 4 carbon atoms or 1,1,2,2-tetrahydroperfluoroalkyl where the perfluoroalkyl moiety is of 6 to 16 carbon atoms;

or is a compound of formula (I)

wherein, $G_1$ is hydrogen, $G_2$ is chloro, fluoro, $CF_3$—, $E_3SO$— or $E_3SO_2$—, $E_1$ is hydrogen or straight or branched alkyl of 1 to 24 carbon atoms, $E_2$ is as defined above, and $E_3$ is straight or branched chain alkyl of 1 to 7 carbon atoms; and with the proviso that formula (I) does not represent 5-chloro-2-(2-hydroxy-3,5-di-tert-butylphenyl)-2H-benzotriazole, 5-chloro-2-(2-hydroxy-3-tert-butyl-5-methylphenyl)-2H-benzotriazole or 2-(2-hydroxy-3,5-di-α-cumyl)-2H-benzotriazole.

Another preferred embodiment is where the benzotriazole is of formula (IIA)

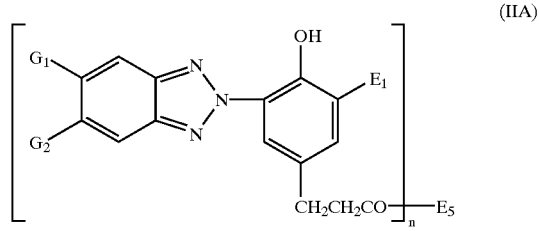

(IIA)

wherein $G_1$ is hydrogen, $G_2$ is $CF_3$— or fluoro, $E_1$ is hydrogen, straight or branched alkyl of 1 to 24 carbon atoms or phenylalkyl of 7 to 15 carbon atoms, when $E_1$ is phenylalkyl of 7 to 15 carbon atoms, $G_2$ may also be hydrogen, $E_5$ is —$OE_6$ or —$NE_7E_8$, or $E_5$ is —X—$(Z)_p$—Y—$E_{15}$ wherein X is —O— or —$N(E_{16})$—, Y is —O— or —$N(E_{17})$—, Z is $C_2$–$C_{12}$-alkylene, $C_4$–$C_{12}$-alkylene interrupted by one to three nitrogen atoms, oxygen atoms or a mixture thereof, or is $C_3$–$C_{12}$-alkylene, butenylene, butynylene, cyclohexylene or phenylene, each substituted by a hydroxyl group, m is 0, 1, 2 or 3, p is 1, or p is also zero when X and Y are —$N(E_{16})$— and —$N(E_{17})$—, respectively, $E_{15}$ is a group —CO—$C(E_{18})$=$C(H)E_{19}$ or, when Y is —$N(E_{17})$—, forms together with $E_{17}$ a group —CO—CH=CH—CO—, wherein $E_{18}$ is hydrogen or methyl, and $E_{19}$ is hydrogen, methyl or —CO—X—$E_{20}$, wherein $E_{20}$ is hydrogen, $C_1$–$C_{12}$-alkyl or a group of the formula

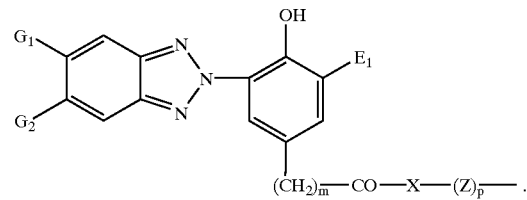

Still another preferred embodiment is a benzotriazole of formula (IIIA)

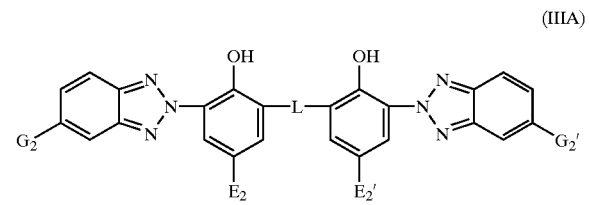

(IIIA)

wherein $G_2$ is $CF_3$, $G_{2'}$ is hydrogen or $CF_3$, $E_2$ and $E_{2'}$ are independently straight or branched alkyl chain of 1 to 24 carbon atoms, straight or branched chain alkenyl of 2 to 18 carbon atoms, cycloalkyl of 5 to 12 carbon atoms, phenylalkyl of 7 to 15 carbon atoms, phenyl, or said phenyl or said phenylalkyl substituted on the phenyl ring by 1 to 3 alkyl of 1 to 4 carbon atoms; and L is alkylene of 1 to 12 carbon atoms, alkylidene of 2 to 12 carbon atoms, benzylidene, p-xylylene, α,α,α',α'-tetramethyl-m-xylylene or cycloalkylidene.

In a more preferred embodiment, the benzotriazole is of formula (I)

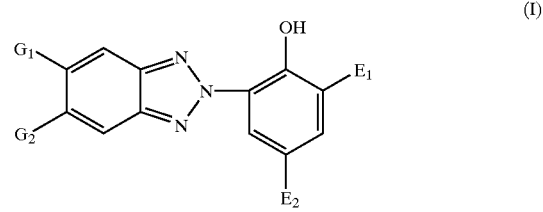

(I)

wherein $G_1$ is hydrogen, $G_2$ is $CF_3$—, $E_1$ is phenylalkyl of 7 to 15 carbon atoms, phenyl, or said phenyl or said phenylalkyl substituted on the phenyl ring by 1 to 4 alkyl of 1 to 4 carbon atoms, $E_2$ is straight or branched alkyl chain of 1 to 24 carbon atoms, straight or branched chain alkenyl of 2 to 18 carbon atoms, cycloalkyl of 5 to 12 carbon atoms, phenylalkyl of 7 to 15 carbon atoms, phenyl, or said phenyl or said phenylalkyl substituted on the phenyl ring by 1 to 3 alkyl of 1 to 4 carbon atoms; or $E_2$ is said alkyl of 1 to 24 carbon atoms or said alkenyl of 2 to 18 carbon atoms substituted by one or more —OH, —$OCOE_{11}$, —$NH_2$ or —$NHCOE_{11}$, or mixtures thereof, or said alkyl or said alkenyl interrupted by one or more —O— and which can be unsubstituted or substituted by one or more —OH, or is a compound of formula (I) wherein,
$G_1$ is hydrogen,
$G_2$ is $CF_3$—,
$E_1$ is hydrogen, straight or branched alkyl of 4 to 24 carbon atoms or phenylalkyl of 7 to 15 carbon atoms, and
$E_2$ is as defined above.

In another preferred embodiment, the benzotriazole is of formula (IIA)

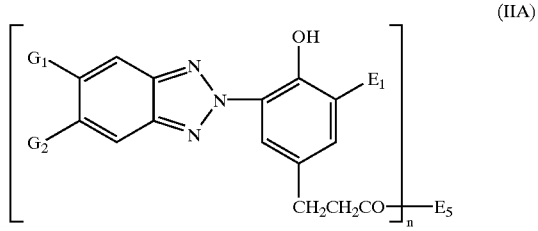

(IIA)

wherein
$G_1$ is hydrogen,
$G_2$ is $CF_3$—,
$E_1$ is hydrogen, straight or branched alkyl of 4 to 24 carbon atoms or phenylalkyl of 7 to 15 carbon atoms,
$E_5$ is —$OE_6$ or —$NE_7E_8$ where
$E_6$ is hydrogen, straight or branched chain $C_1$–$C_{24}$alkyl which is unsubstituted or substituted by one or more OH groups, or —$OE_6$ is —$(OCH_2CH_2)_wOH$ or —$(OCH_2CH_2)_wOE_{21}$ where w is 1 to 12 and $E_{21}$ is alkyl of 1 to 12 carbon atoms, and
$E_7$ and $E_8$ are independently hydrogen, alkyl of 1 to 18 carbon atoms, straight or branched chain $C_3$–$C_{18}$alkyl which is interrupted by —O—, —S— or —$NE_{11}$—, $C_5$–$C_{12}$cycloalkyl, $C_6$–$C_{14}$aryl or $C_1$–$C_3$hydroxylalkyl, or $E_7$ and $E_8$ together with the N atom are a pyrrolidine, piperidine, piperazine or morpholine ring.

In an especially preferred embodiment, the benzotriazole is of formula (IIIA)

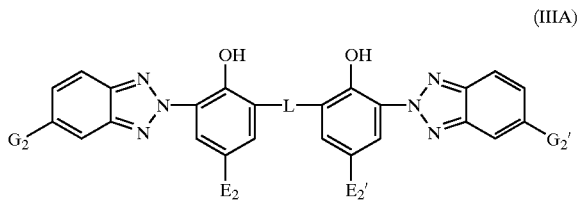

(IIIA)

wherein
$G_2$ is $CF_3$,
$G_2$ is hydrogen or $CF_3$,
$E_2$ and $E_2'$ are independently straight or branched alkyl chain of 1 to 24 carbon atoms, straight or branched chain alkenyl of 2 to 18 carbon atoms, cycloalkyl of 5 to 12 carbon atoms, phenylalkyl of 7 to 15 carbon atoms, phenyl, or said phenyl or said phenylalkyl substituted on the phenyl ring by 1 to 3 alkyl of 1 to 4 carbon atoms; and
L is methylene.
Preferably, the benzotriazole is a compound which is
(a) 5-trifluoromethyl-2-(2-hydroxy-3-α-cumyl-5-tert-octylphenyl)-2H-benzotriazole;
(b) 5-trifluoromethyl-2-(2-hydroxy-5-tert-octylphenyl)-2H-benzotriazole;
(c) 5-trifluoromethyl-2-(2-hydroxy-3,5-di-tert-octylphenyl)-2H-benzotriazole;
(d) 2,2'-methylene-bis[6-(5-trifluoromethyl-2H-benzotriazol-2-yl)-4-tert-octylphenol];
(e) methylene-2-[4-tert-octyl-6-(2H-benzotriazol-2-yl)phenol]2'-[4-tert-butyl-6-(5-trifluoromethyl-2H-benzotriazol-2-yl)phenol];
(f) 3-(5-trifluoromethyl-2H-benzotriazol-2-yl)-5-tert-butyl-4-hydroxyhydrocinnamic acid;
(g) methyl 3-(5-trifluoromethyl-2H-benzotriazol-2-yl)-5-tert-butyl-4-hydroxy-hydrocinnamate;
(h) isooctyl 3-(5-trifluoromethyl-2H-benzotriazol-2-yl)-5-tert-butyl-4-hydroxy-hydrocinnamate;
(i) 5-trifluoromethyl-2-[2-hydroxy-5-(3-hydroxypropyl)phenyl]-2H-benzotriazole;
(j) 5-butylsulfonyl-2-(2-hydroxy-3-α-cumyl-5-tert-octylphenyl)-2H-benzotriazole;
(k) 5-octylsulfonyl-2-(2-hydroxy-3,5-di-α-cumylphenyl)-2H-benzotriazole;
(l) 5-dodecylsulfonyl-2-(2-hydroxy-3,5-di-tert-butylphenyl)-2H-benzotriazole;
(m) 5-octylsulfonyl-2-(2-hydroxy-3,5-di-tert-octylphenyl)-2H-benzotriazole;
(n) 5-trifluoromethyl-2-(2-hydroxy-3-α-cumyl-5-tert-butylphenyl)-2H-benzotriazole;
(o) 5-trifluoromethyl-2-(2-hydroxy-3-α-cumyl-5-nonylphenyl)-2H-benzotriazole;
(p) 5-trifluoromethyl-2-[2-hydroxy-3-α-cumyl-5-(2-hydroxyethyl)phenyl]-2H-benzotriazole;
(q) 5-trifluoromethyl-2-[2-hydroxy-3-α-cumyl-5-(3-hydroxypropyl)phenyl]-2H-benzotriazole;
(r) 5-trifluoromethyl-2-(2-hydroxy-3,5-di-tert-amylphenyl)-2H-benzotriazole;
(s) 5-trifluoromethyl-2-(2-hydroxy-3,5-di-tert-butylphenyl)-2H-benzotriazole;
(t) 5-trifluoromethyl-2-(2-hydroxy-3-dodecyl-5-methylphenyl)-2H-benzotriazole;
(u) 5-trifluoromethyl-2-[2-hydroxy-3-tert-butyl-5-(3-hydroxypropyl)phenyl)]-2H-benzotriazole;
(v) 5-trifluoromethyl-2-[2-hydroxy-3-tert-butyl-5-(2-hydroxyethyl)phenyl]-2H-benzotriazole;
(w) 5-trifluoromethyl-2-[2-hydroxy-5-(2-hydroxyethyl)phenyl]-2H-benzotriazole;
(x) 5-trifluoromethyl-2-(2-hydroxy-3,5-di-α-cumylphenyl)-2H-benzotriazole;
(y) 5-fluoro-2-(2-hydroxy-3,5-di-α-cumylphenyl)-2H-benzotriazole;
(z) 5-butylsulfonyl-2-(2-hydroxy-3,5-di-α-cumylphenyl)-2H-benzotriazole;
(aa) 5-butylsulfonyl-2-(2-hydroxy-3,5-di-tert-butylphenyl)-2H-benzotriazole;
(bb) 5-butylsulfonyl-2-(2-hydroxy-3,5-di-tert-octylphenyl)-2H-benzotriazole;
(cc) 5-phenylsulfonyl-2-(2-hydroxy-3,5-di-tert-butylphenyl)-2H-benzotriazole;
(dd) 5-chloro-2-(2-hydroxy-3,5-di-α-cumylphenyl)-2H-benzotriazole;
(ee) 5-chloro-2-(2-hydroxy-3-α-cumyl-5-tert-octylphenyl)-2H-benzotriazole;
(ff) isooctyl 3-(5-chloro-2H-benzotriazol-2-yl)-5-tert-butyl-4-hydroxyhydrocinnamate; and
(gg) 2-(2-hydroxy-3-α-cumyl-5-tert-octylphenyl)-2H-benzotriazole.

Most preferably, the benzotriazoles of special interest are (a) 5-trifluoromethyl-2-(2-hydroxy-3-α-cumyl-5-tert-octylphenyl)-2H-benzotriazole;

(b) 5-trifluoromethyl-2-(2-hydroxy-5-tert-octylphenyl)-2H-benzotriazole;

(c) 5-trifluoromethyl-2-(2-hydroxy-3,5-di-tert-octylphenyl)-2H-benzotriazole;

(g) methyl 3-(5-trifluoromethyl-2H-benzotriazol-2-yl)-5-tert-butyl-4-hydroxy-hydrocinnamate;

(j) 5-butylsulfonyl-2-(2-hydroxy-3-α-cumyl-5-tert-octylphenyl)-2H-benzotriazole;

(n) 5-trifluoromethyl-2-(2-hydroxy-3-α-cumyl-5-tert-butylphenyl)-2H-benzotriazole;

(s) 5-trifluoromethyl-2-(2-hydroxy-3,5-di-tert-butylphenyl)-2H-benzotriazole;

(x) 5-trifluoromethyl-2-(2-hydroxy-3,5-di-α-cumylphenyl)-2H-benzotriazole;

(aa) 5-butylsulfonyl-2-(2-hydroxy-3,5-di-tert-butylphenyl)-2H-benzotriazole; and (cc) 5-phenylsulfonyl-2-(2-hydroxy-3,5-di-tert-butylphenyl)-2H-benzotriazole.

The durable tris-aryl-s-triazines of the instant invention are typical commercial s-triazine UV absorbers based on 4,6-bis-(2,4-dimethylphenyl)-2-(2,4-dihydroxyphenyl)-s-triazine such as Tinuvin® 400, Ciba Specialty Chemicals Corp., and Cyasorb® 1164, Cytec Corporation, or they are red-shifted s-triazines as disclosed for example in U.S. Pat. Nos. 5,556,973 and 5,354,794, or they are high molar extinction s-triazines as disclosed in copending application Ser. No. 09/383,163.

The s-triazine UV absorbers of component (b) are of formula (IV), (V), (VI), (VII), (VIII) or (IX)

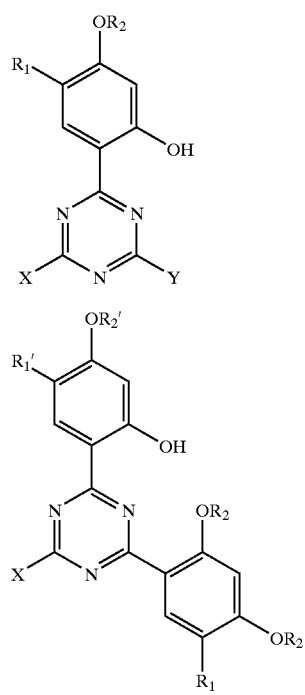

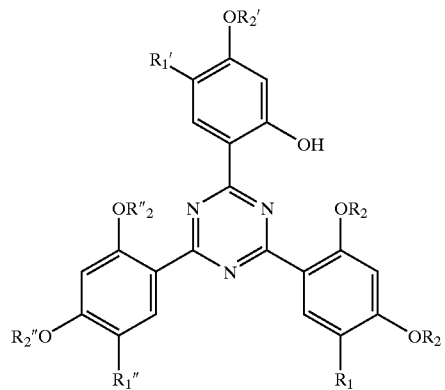

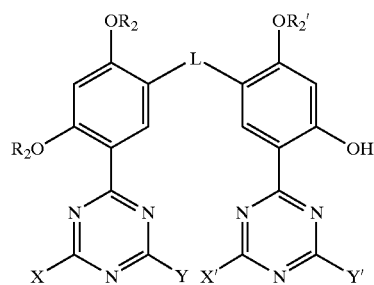

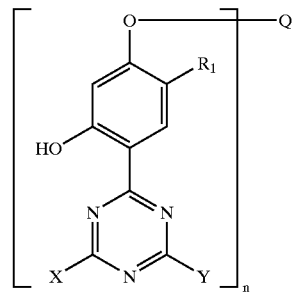

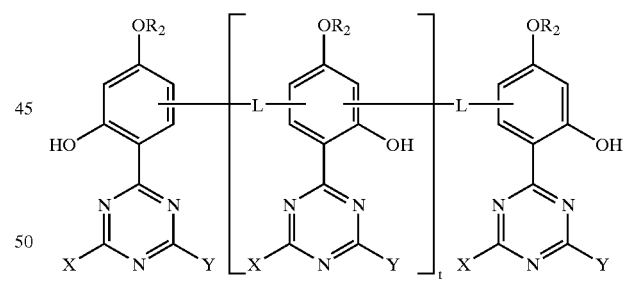

wherein

X and Y are independently phenyl, naphthyl, or said phenyl or said naphthyl substituted by one to three alkyl of 1 to 6 carbon atoms, by halogen, by hydroxy or by alkoxy of 1 to 6 carbon atoms or by mixtures thereof; or X and Y are independently $Z_1$ or $Z_2$;

$R_1$ is hydrogen, straight or branched chain alkyl of 1 to 24 carbon atoms, cycloalkyl of 5 to 12 carbon atoms, phenylalkyl of 7 to 15 carbon atoms, halogen, —$SR_3$, —$SOR_3$ or —$SO_2R_3$; or said alkyl, said cycloalkyl or said phenylalkyl substituted by one to three halogen, —$R_4$, —$OR_5$, —$N(R_5)_2$, —$COR_5$, —$COOR_5$, —$OCOR_5$, —CN, —$NO_2$, —$SR_5$, —$SOR_5$, —$SO_2R_5$ or —$P(O)(OR_5)_2$, morpholinyl, piperidinyl, 2,2,6,6-tetramethylpiperidinyl, piperazinyl or N-methylpiperidinyl groups or combinations thereof; or said alkyl or said cycloalkyl interrupted by one to four phenylene, —O—, —NR$_5$—, —CONR$_5$—, —COO—, —OCO— or —CO groups or combinations thereof; or said alkyl or said cycloalkyl both substituted and interrupted by combinations of the groups mentioned above;

R$_3$ is alkyl of 1 to 20 carbon atoms, alkenyl of 3 to 18 carbon atoms, cycloalkyl of 5 to 12 carbon atoms, phenylalkyl of 7 to 15 carbon atoms, aryl of 6 to 10 carbon atoms or said aryl substituted by one or two alkyl of 1 to 4 carbon atoms;

R$_4$ is aryl of 6 to 10 carbon atoms or said aryl substituted by one to three halogen, alkyl of 1 to 8 carbon atoms, alkoxy of 1 to 8 carbon atoms or combinations thereof; cycloalkyl of 5 to 12 carbon atoms; phenylalkyl of 7 to 15 carbon atoms or said phenylalkyl substituted on the phenyl. ring by one to three halogen, alkyl of 1 to 8 carbon atoms, alkoxy of 1 to 8 carbon atoms or combinations thereof; or straight or branched chain alkenyl of 2 to 18 carbon atoms;

R$_5$ is defined as is R$_4$; or R$_5$ is also hydrogen or straight or branched chain alkyl of 1 to 24 carbon atoms, alkenyl of 2 to 24 carbon atoms; or R$_5$ is a group for formula

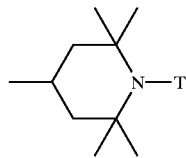

T is hydrogen, oxyl, hydroxyl, —OT$_1$, alkyl of 1 to 24 carbon atoms, said alkyl substituted by one to three hydroxy; benzyl or alkanoyl of 2 to 18 carbon atoms;

T$_1$ is alkyl of 1 to 24 carbon atoms, cycloalkyl of 5 to 12 carbon atoms, alkenyl of 2 to 24 carbon atoms, cycloalkenyl of 5 to 12 carbon atoms, phenylalkyl of 7 to 15 carbon atoms, a radical of a saturated or unsaturated bicyclic or tricyclic hydrocarbon of 7 to 12 carbon atoms or aryl of 6 o 10 carbon atoms or said aryl substituted by one to three alkyl of 1 to 4 carbon atoms;

R$_2$ is hydrogen, straight or branched chain alkyl of 1 to 24 carbon atoms or cycloalkyl of 5 to 12 carbon atoms; or said alkyl or said cycloalkyl substitute by one to four halogen, epoxy, glycidyloxy, furyloxy, —R$_4$, —OR$_5$, —N(R$_5$)$_2$, —CON(R$_5$)$_2$, —COR$_5$, —COOR$_5$, —OCOR$_5$, —OCOC(R$_5$)=C(R$_5$)$_2$, —C(R$_5$)=CCOOR$_5$, —CN, —NCO, or

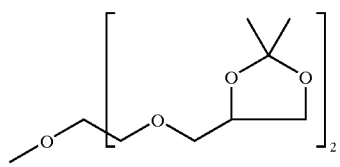

or combinations thereof; or said alkyl or said cycloalkyl interrupted by one to four epoxy, —O—, —NR$_5$—, —CONR$_5$—, —COO—, —OCO—, —CO—, —C(R$_5$)=C(R$_5$)COO—, —OCOC(R$_5$)=C(R$_5$)—, —C(R$_5$)=C(R$_5$)—, phenylene or phenylene-G-phenylene in which G is —O—, —S—, —SO$_2$—, —CH$_2$— or —C(CH$_3$)$_2$— or combinations thereof, or said alkyl or said cycloalkyl both substituted and interrupted by combinations of the groups mentioned above; or R$_2$ is —SO$_2$R$_3$ or —COR$_6$;

R$_6$ is straight or branched chain alkyl of 1 to 18 carbon atoms, straight or branched chain alkenyl of 2 to 12 carbon atoms, phenoxy, alkylamino of 1 to 12 carbon atoms, arylamino of 6 to 12 carbon atoms, —R$_7$COOH or —NH—R$_8$—NCO;

R$_7$ is alkylene of 2 to 14 carbon atoms or phenylene;

R$_8$ is alkylene of 2 to 24 carbon atoms, phenylene, tolylene, diphenylmethane or a group

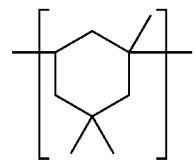

R$_1$' and R$_1$" are the same or different and are as defined for R$_1$;

R$_2$' and R$_2$" are the same or different and are as defined for R$_2$;

X, X', Y and Y' are the same or different and are as defined for X and Y;

t is 0 to 9;

L is straight or branched alkylene of 1 to 12 carbon atoms, cycloalkylene of 5 to 12 carbon atoms or alkylene substituted or interrupted by cyclohexylene or phenylene; or L is benzylidene; or L is —S—, —S—S—, —S—E—S—, —SO—, —SO$_2$—, —SO—E—SO—, —SO$_2$—E—SO$_2$—, —CH$_2$—NH—E—NH—CH$_2$— or

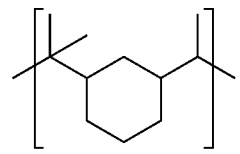

E is alkylene of 2 to 12 carbon atoms, cycloalkylene of 5 to 12 carbon atoms or alkylene interrupted or terminated by cycloalkylene of 5 to 12 carbon atoms;

n is 2, 3 or 4;

when n is 2; Q is straight or branched alkylene of 2 to 16 carbon atoms; or said alkylene substituted by one to three hydroxy groups; or said alkylene interrupted by one to three —CH=CH— or —O—; or said alkylene both substituted and interrupted by combinations of the groups mentioned above; or Q is xylylene or a group —CONH—R$_8$—NHCO—, —CH$_2$CH(OH)CH$_2$O—R$_9$—OCH$_2$CH(OH)CH$_2$—, —CO—R$_{10}$—CO—, or —(CH$_2$)$_m$—COO—R$_{11}$—OOC—(CH$_2$)$_m$— is 1 to 3; or Q is

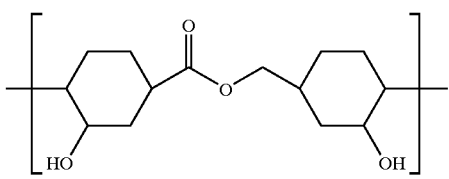

$R_9$ is alkylene of 2 to 50 carbon atoms; or said alkylene interrupted by one to ten —O—, phenylene or a group-phenylene-G-phenylene in which G is —O—, —S—, —SO$_2$—, —CH$_2$— or —C(CH$_3$)$_2$—;

$R_{10}$ is alkylene of 2 to 10 carbon atoms, or said alkylene interrupted by one to four —O—, —S— or —CH═CH—; or $R_{10}$ is arylene of 6 to 12 carbon atoms;

$R_{11}$ is alkylene of 2 to 20 carbon atoms or said alkylene interrupted by one to eight —O—;

when n is 3, Q is a group —[(CH$_2$)$_m$COO]$_3$—R$_{12}$ where m is 1 to 3, and $R_{12}$ is an alkanetriyl of 3 to 12 carbon atoms;

when n is 4, Q is a group —[(CH$_2$)$_m$COO]$_4$—R$_{13}$ where m is 1 to 3, and $R_{14}$ is an alkanetetrayl of 4 to 12 carbon atoms;

$Z_1$ is a group of formula

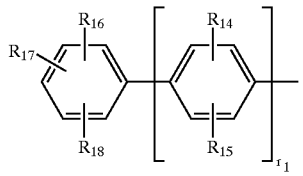

$Z_2$ is a group of formula

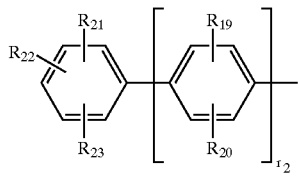

where $r_1$ and $r_2$ are independently of each other 0 or 1;

$R_{14}$, $R_{15}$, $R_{16}$, $R_{17}$, $R_{18}$, $R_{19}$, $R_{20}$, $R_{21}$, $R_{22}$ and $R_{23}$ are independently of one another hydrogen, hydroxy, cyano, alkyl of 1 to 20 carbon atoms, alkoxy of 1 to 20 carbon atoms, phenylalkyl of 7 to 15 carbon atoms, cycloalkyl of 5 to 12 carbon atoms, cycloalkoxy of 5 to 12 carbon atoms, halogen, haloalkyl of 1 to 5 carbon atoms, sulfo, carboxy, acylamino of 2 to 12 carbon atoms, acyloxy of 2 to 12 carbon atoms, alkoxycarbonyl of 2 to 12 carbon atoms or aminocarbonyl; or $R_{17}$ and $R_{18}$ or $R_{22}$ and $R_{23}$ together with the phenyl radical to which they are attached are a cyclic radical interrupted by one to three —O— or —NR$_5$—;

with the proviso that the compound of formula (IV) is not 4,6-diphenyl-2-(4-hexyloxy-2-hydroxyphenyl)-s-triazine.

Preferably, the invention pertains to compounds of formula (IV) where X and Y are the same or different and are phenyl or said phenyl substituted by one to three alkyl of 1 to 6 carbon atoms, halogen, hydroxy or alkoxy of 1 to 12 carbon atoms; or X and Y are $Z_1$ or $Z_2$;

$R_1$ is hydrogen, straight or branched chain alkyl of 1 to 24 carbon atoms, cycloalkyl of 5 to 12 carbon atoms, phenylalkyl of 7 to 15 carbon atoms or halogen;

$R_2$ is hydrogen, straight or branched chain alkyl of 1 to 24 carbon atoms or cycloalkyl of 5 to 12 carbon atoms; or said alkyl or said cycloalkyl substituted by one to three —R$_4$, —OR$_5$, —COOR$_5$, —OCOR$_5$ or combinations thereof; or said alkyl or cycloalkyl interrupted by one to three epoxy, —O—, —COO—, —OCO— or —CO—;

$R_4$ is aryl of 6 to 10 carbon atoms or said aryl substituted by one to three halogen, alkyl of 1 to 8 carbon atoms, alkoxy of 1 to 8 carbon atoms or combinations thereof; cycloalkyl of 5 to 12 carbon atoms; phenylalkyl of 7 to 15 carbon atoms or said phenylalkyl substituted on the phenyl ring by one to three halogen, alkyl of 1 to 8 carbon atoms, alkoxy of 1 to 8 carbon atoms or combinations thereof;

$R_1$ is defined as is $R_4$; or $R_5$ is also hydrogen or straight or branched chain alkyl of 1 to 24 carbon atoms;

$Z_1$ is a group of formula

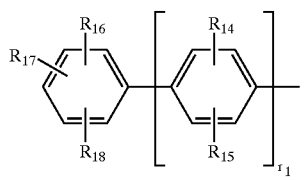

$Z_2$ is a group of formula

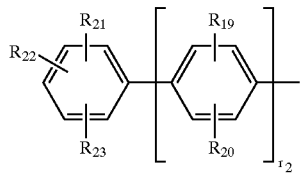

where $r_1$ and $r_2$ are each 1; and $R_{14}$, $R_{15}$, $R_{16}$, $R_{17}$, $R_{18}$, $R_{19}$, $R_{20}$, $R_{21}$, $R_{22}$ and $R_{23}$ are independently of one another hydrogen, hydroxy, cyano, alkyl of 1 to 20 carbon atoms, alkoxy of 1 to 20 carbon atoms, phenylalkyl of 7 to 15 carbon atoms, cycloalkyl of 5 to 12 carbon atoms, cycloalkoxy of 5 to 12 carbon atoms, halogen, haloalkyl of 1 to 5 carbon atoms, sulfo, carboxy, acylamino of 2 to 12 carbon atoms, acyloxy of 2 to 12 carbon atoms, or alkoxycarbonyl of 2 to 12 carbon atoms or aminocarbonyl;

with the proviso that the compound of formula (IV) is not 4,6-diphenyl-2-(4-hexyloxy-2-hydroxyphenyl)-s-triazine.

Preferably, the s-triazine UV absorber is also of formula (V) where

X is phenyl, naphthyl or said phenyl or said naphthyl substituted by one to three alkyl of 1 to 6 carbon atoms, by halogen, by hydroxy or by alkoxy of 1 to 6 carbon atoms or by mixtures thereof; or X is $Z_1$.

Preferably, the s-triazine UV absorber is also of formula (VI).

Preferably, the s-triazine UV absorber is also of formula (IX) where

X and Y are independently phenyl or said phenyl substituted by one to three alkyl of 1 to 6 carbon atoms, by halogen, by hydroxy or by alkoxy of 1 to 6 carbon atoms or by mixtures thereof; or X and Y are independently $Z_1$ or $Z_2$; and L is straight or branched alkylene of 1 to 12 carbon atoms, cycloalkylene of 5 to 12 carbon atoms or alkylene substituted or interrupted by cyclohexylene or phenylene.

Most preferably, the instant s-triazine UV absorber is of formula (IV) where X and Y are the same or different and are phenyl or said phenyl substituted by one to three alkyl of 1 to 6 carbon atoms; $Z_1$ or $Z_2$;

$R_1$ is hydrogen or phenylalkyl of 7 to 15 carbon atoms;

$R_2$ is hydrogen, straight or branched chain alkyl of 1 to 18 carbon atoms; or said alkyl substituted by one to three —$R_4$, —$OR_5$ or mixtures thereof; or said alkyl interrupted by one to eight —O— or —COO—;

$R_4$ is aryl of 6 or 10 carbon atoms;

$R_5$ is hydrogen;

$Z_1$ is a group of formula

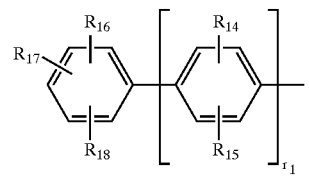

$Z_2$ is a group of formula

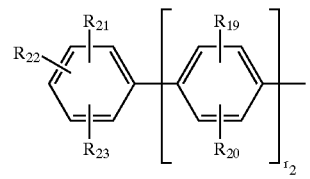

where
$r_1$ and $r_2$ are each 1; and
$R_{14}$, $R_{15}$, $R_{16}$, $R_{17}$, $R_{18}$, $R_{19}$, $R_{20}$, $R_{21}$, $R_{22}$ and $R_{23}$ are each hydrogen;
with the proviso that the compound of formula (IV) is not 4,6-diphenyl-2-(4-hexyloxy-2-hydroxyphenyl)-s-triazine.

Preferably, the s-triazine UV absorber of this invention is a compound which is (1)

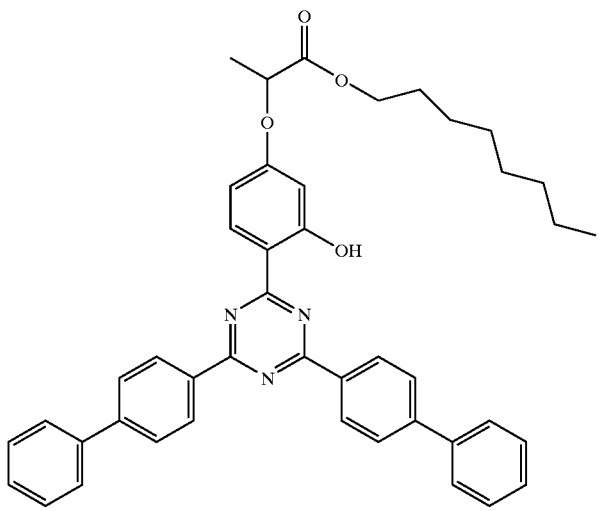

(2)

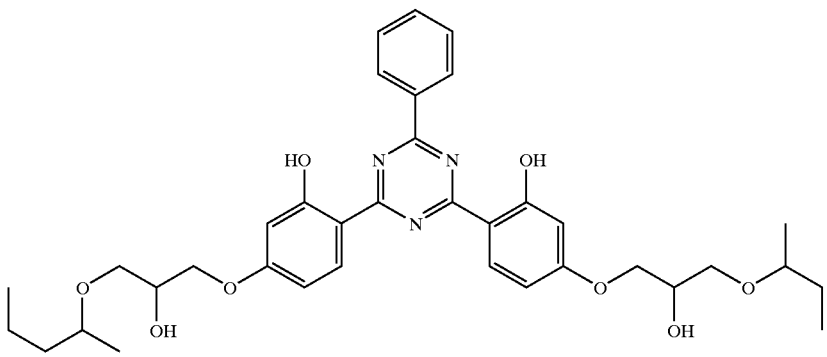

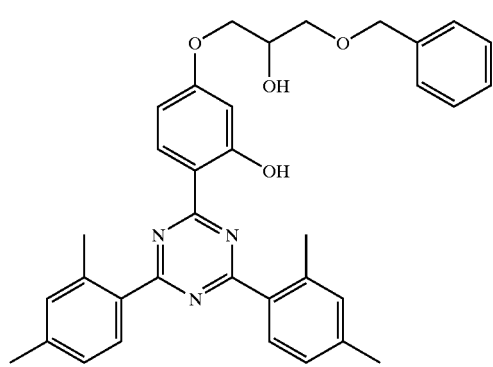 (3)
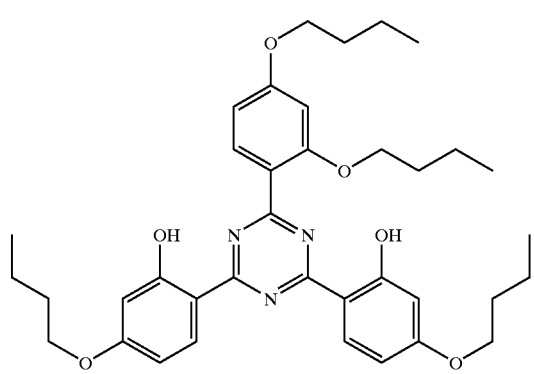 (4)
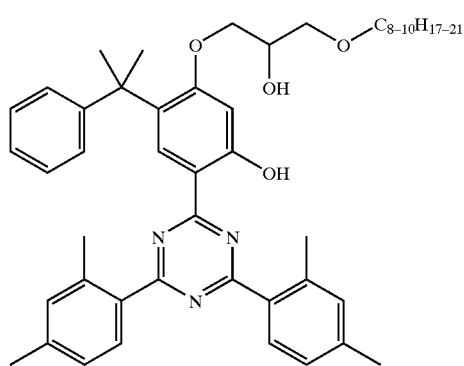 (5)
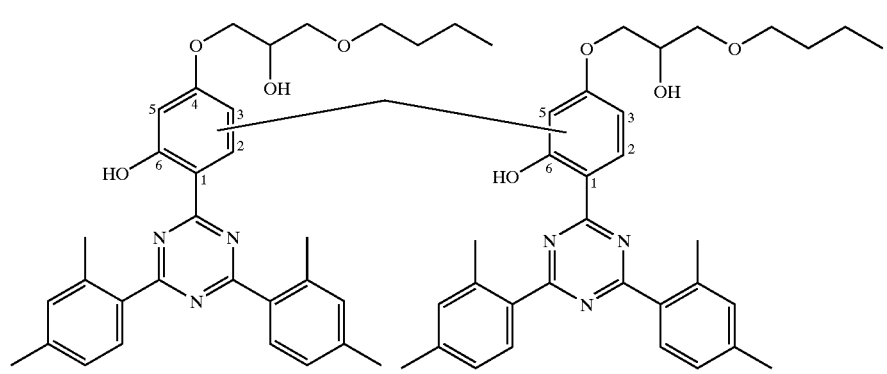 (6)
methylene bridged dimer mixture bridged in the 3:5', 5:5' and 3:3' positions in a 5:4:1 ratio

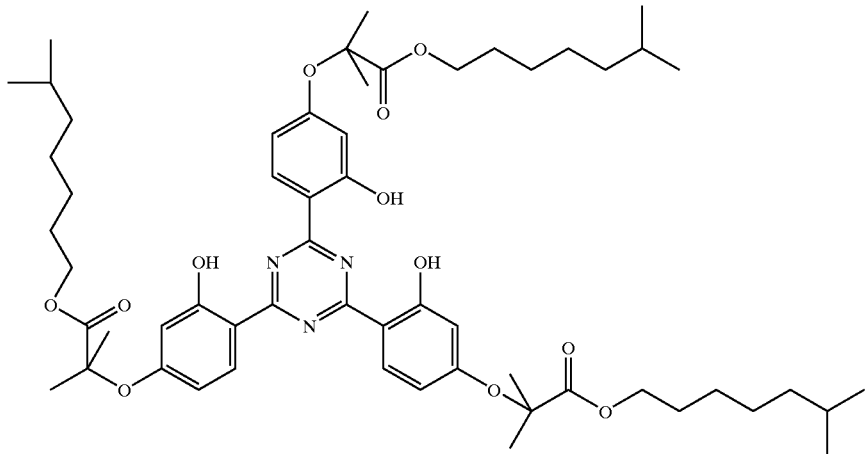
(7)
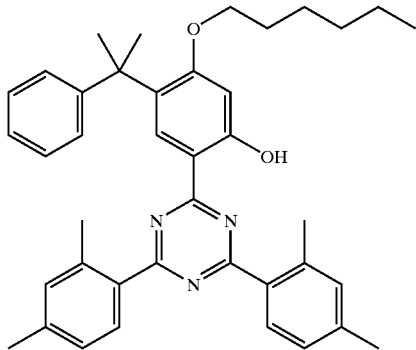
(8)
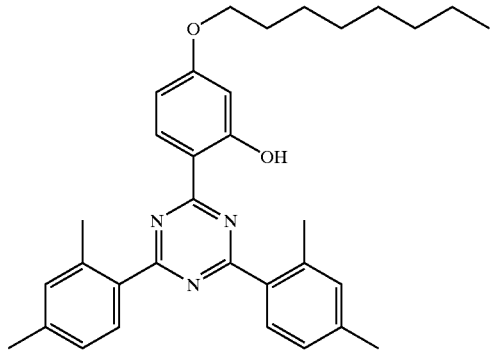
(9)
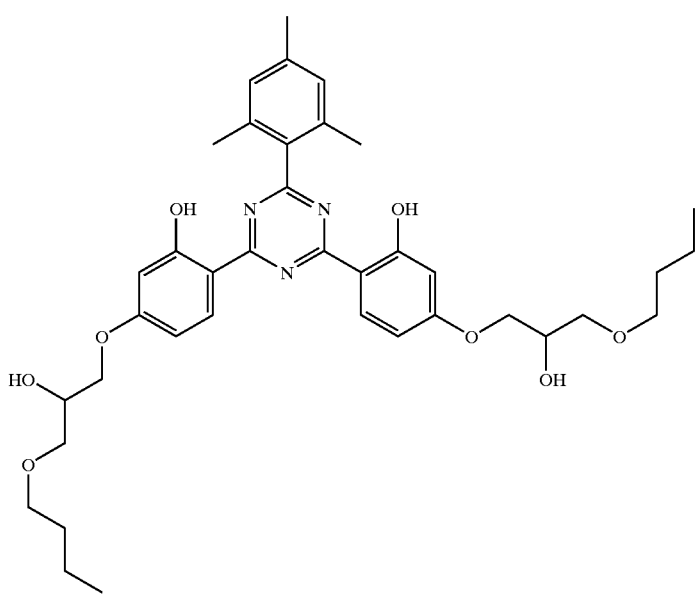
(10)

-continued (11)

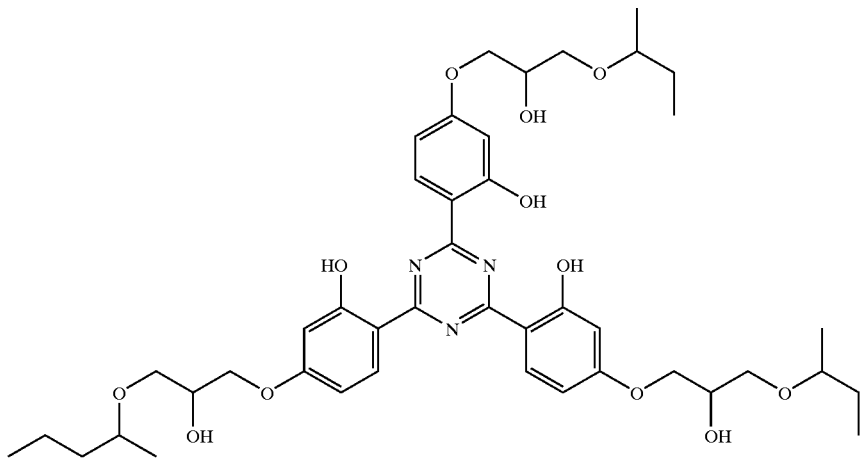

The names of the instant compounds illustrated in the structures given above as listed below as indicated.
(1) 2,4-bis(4-biphenylyl)-6-(2-hydroxy-4-octyloxycarbonylethylideneoxyphenyl)-s-triazine;
(2) 2-phenyl-4-[2-hydroxy-4-(3-sec-butyloxy-2-hydroxypropyloxy)phenyl]-6-[2-hydroxy-4-(3-sec-amyloxy-2-hydroxypropyloxy)phenyl]-s-triazine;
(3) 2,4-bis(2,4-dimethylphenyl)-6-[2-hydroxy-4-(3-benzyloxy-2-hydroxypropyloxy)-phenyl]-s-triazine;
(4) 2,4-bis(2-hydroxy-4-n-butyloxyphenyl)-6-(2,4-di-n-butyloxyphenyl)-s-triazine;
(5) 2,4-bis(2,4-dimethylphenyl)-6-[2-hydroxy-4-(3-nonyloxy*-2-hydroxypropyloxy)-5-α-cumylphenyl]-s-triazine; (* denotes a mixture of octyloxy, nonyloxy and decyloxy groups)
(6) methylenebis-{2,4-bis(2,4-dimethylphenyl)-6-[2-hydroxy-4-(3-butyloxy-2-hydroxy-propoxy)phenyl]-s-triazine}, methylene bridged dimer mixture bridged in the 3:5', 5:5' and 3:3' positions in a 5:4:1 ratio;
(7) 2,4,6-tris(2-hydroxy-4-isooctyloxycarbonylisopropylideneoxyphenyl)-s-triazine;
(8) 2,4-bis(2,4-dimethylphenyl)-6-(2-hydroxy-4-hexyloxy-5-α-cumylphenyl)-s-triazine;
(9) 2,4-bis(2,4-dimethylphenyl)-6-(2-hydroxy-4-octyloxyphenyl)-s-triazine, CYASORB® 1164, Cytec;
(10) 2-(2,4,6-trimethylphenyl)-4,6-bis[2-hydroxy-4-(3-butyloxy-2-hydroxypropyloxy)-phenyl]-s-triazine; or
(11) 2,4,6-tris[2-hydroxy-4-(3-sec-butyloxy-2-hydroxypropyloxy)phenyl]-s-triazine.
Preferably, the s-triazine UV absorber of component (b) is
(1) 2,4-bis(4-biphenylyl)-6-(2-hydroxy-4-octyloxycarbonylethylideneoxyphenyl)-s-triazine;
(5) 2,4-bis(2,4-dimethylphenyl)-6-[2-hydroxy-4-(3-nonyloxy*-2-hydroxypropyloxy)-5-α-cumylphenyl]-s-triazine; (* denotes a mixture of octyloxy, nonyloxy and decyloxy groups) or
(7) 2,4,6-tris(2-hydroxy-4-isooctyloxycarbonylisopropylideneoxyphenyl)-s-triazine.
The effective stabilizing amount of the compound or compounds of component (b) is about 0.1 to about 20% by weight based on the weight of the plastic container or film composition.

A preferred embodiment of the present invention are where mixtures of stabilizers of component (b) are employed, for example a mixture of at least one benzotriazole and at least one s-triazine or a mixture of two or more benzotriazoles or two or more s-triazines. The UV absorbers of component (b) are all highly durable, but have different UV light absorbing characteristics depending on their substitution pattern. By selection of particular combinations of UV absorbers, one may optimize the UV absorbing characteristics and the color of the compositions of this invention.

Another preferred embodiment of the present invention is where a benzotriazole UV absorber not of the class described herein is employed in addition to the compound or compounds of component (b).

The instant plastic container or film stabilized by a compound or compounds of component (b) may also optionally contain from about 0.01 to about 10% by weight; preferably from about 0.025 to about 5% by weight, and most preferably from about 0.1 to about 3% by weight of additional coadditives such as antioxidants, other UV absorbers, hindered amines, phosphites or phosphonites, hydroxylamines, nitrones, benzofuran-2-ones, thiosynergists, polyamide stabilizers, metal stearates, nucleating agents, fillers, reinforcing agents, lubricants, emulsifiers, dyes, pigments, optical brighteners, flame retardants, antistatic agents, blowing agents and the like.

The stabilizers of the instant invention may readily be incorporated into the present container or film compositions by conventional techniques, at any convenient stage prior to the manufacture of articles therefrom. For example, the stabilizer may be mixed with the polymer in dry powder form, or a suspension or emulsion of the stabilizer may be mixed with a solution, suspension, or emulsion of the polymer. The resulting stabilized compositions of the invention may optionally also contain from about 0.01 to about 10%, preferably from about 0.025 to about 5%, and especially from about 0.1 to about 3% by weight of various conventional stabilizer coadditives, such as the materials listed below, or mixtures thereof.

1. Antioxidants
1.1. Alkylated Monophenols, for Example,
2,6-di-tert-butyl-4-methylphenol
2-tert-butyl-4,6-dimethylphenol
2,6-di-tert-butyl-4-ethylphenol
2,6-di-tert-butyl-4-n-butylphenol
2,6-di-tert-butyl-4-i-butylphenol 2,6-di-cyclopentyl-4-methylphenol
2-(α-methylcyclohexyl)-4,6-dimethylphenol
2,6-di-octadecyl-4-methylphenol
2,4,6-tri-cyclohexylphenol
2,6-di-tert-butyl-4-methoxymethylphenol 1.2. Alkylated Hydroquinones, for Example, 2,6-di-tert-butyl-4-methoxyphenol
2,5-di-tert-butyl-hydroquinone
2,5-di-tert-amyl-hydroquinone
2,6-diphenyl-4-octadecyloxyphenol 1.3. Hydroxylated Thiodiphenyl Ethers, for Example, 2,2'-thio-bis-(6-tert-butyl-4-methylphenol)
2,2'-thio-bis-(4-octylphenol)
4,4'-thio-bis-(6-tert-butyl-3-methylphenol)
4,4'-thio-bis-(6-tert-butyl-2-methylphenol)

1.4. Alkylidene-bisphenols, for Example, 2,2'-methylene-bis-(6-tert-butyl-4-methylphenol)
2,2'-methylene-bis-(6-tert-butyl-4-ethylphenol)
2,2'-methylene-bis-[4-methyl-6-(α-methylcyclohexyl)-phenol]
2,2'-methylene-bis-(4-methyl-6-cyclohexylphenol)
2,2'-methylene-bis-(6-nonyl-4-methylphenol)
2,2'-methylene-bis-[6-(α-methylbenzyl)-4-nonylphenol]
2,2'-methylene-bis-[6-(α,α-dimethylbenzyl)-4-nonylphenol]
2,2'-methylene-bis-(4,6-di-tert-butylphenol)
2,2'-ethylidene-bis-(4,6-di-tert-butylphenol)
2,2'-ethylidene-bis-(6-tert-butyl-4-isobutylphenol)
4,4'-methylene-bis-(2,6-di-tert-butylphenol)
4,4'-methylene-bis-(6-tert-butyl-2-methylphenol)
1,1-bis-(5-tert-butyl-4-hydroxy-2-methylphenyl)-butane
2,6-di-(3-tert-butyl-5-methyl-2-hydroxybenzyl)-4-methylphenol
1,1,3-tris-(5-tert-butyl-4-hydroxy-2-methylphenyl)-butane
1,1-bis-(5-tert-butyl-4-hydroxy-2-methylphenyl)-3-n-dodecylmercaptobutane
ethyleneglycol bis-[3,3-bis-(3'-tert-butyl-4'-hydroxyphenyl)-butyrate]
di-(3-tert-butyl-4-hydroxy-5-methylphenyl)-dicyclopentadiene
di-[2-(3'-tert-butyl-2'-hydroxy-5'-methyl-benzyl)-6-tert-butyl-4-methylphenyl] terephthalate.

1.5. Benzyl Compounds, for Example, 1,3,5-tri-(3,5-di-tert-butyl-4-hydroxybenzyl)-2,4,6-trimethylbenzene
di-(3,5-di-tert-butyl-4-hydroxybenzyl) sulfide
3,5-di-tert-butyl-4-hydroxybenzyl-mercapto-acetic acid isooctyl ester
bis-(4-tert-butyl-3-hydroxy-2,6-dimethylbenzyl)dithiol terephthalate
1,3,5-tris-(3,5-di-tert-butyl-4-hydroxybenzyl) isocyanurate
1,3,5-tris-(4-tert-butyl-3-hydroxy-2,6-dimethylbenzyl) isocyanurate
3,5-di-tert-butyl-4-hydroxybenzyl-phosphoric acid diocta-decyl ester
3,5-di-tert-butyl-4-hydroxybenzyl-phosphoric acid monoethyl ester, calcium-salt 1.6. Acylaminophenols, for Example, 4-hydroxy-lauric acid anilide
4-hydroxy-stearic acid anilide
2,4-bis-octylmercapto-6-(3,5-tert-butyl-4-hydroxyanilino)-s-triazine
octyl-N-(3,5-di-tert-butyl-4-hydroxyphenyl)-carbamate 1.7. Esters of β-(3,5-di-tert-butyl-4-hydroxyphenyl)-propionic acid with Monohydric or Polyhydric Alcohols, for Example,

| | |
|---|---|
| methanol | diethylene glycol |
| octadecanol | triethylene glycol |
| 1,6-hexanediol | pentaerythritol |
| neopentyl glycol | tris-hydroxyethyl isocyanurate |
| thiodiethylene glycol | di-hydroxyethyl oxalic acid diamide |
| triethanolamine | triisopropanolamine |

1.8. Esters of β-(5-tert-butyl-4-hydroxy-3-methylphenyl)-propionic acid with Monohydric or Polyhydric Alcohols, for Example,

| | |
|---|---|
| methanol | diethylene glycol |
| octadecanol | triethylene glycol |
| 1,6-hexanediol | pentaerythritol |
| neopentyl glycol | tris-hydroxyethyl isocyanurate |
| thiodiethylene glycol | di-hydroxyethyl oxalic acid diamide |
| triethanolamine | triisopropanolamine |

1.9. Amides of β-(3,5-di-tert-butyl-4-hydroxyphenyl)-propionic acid for Example, N,N'-di-(3,5-di-tert-butyl-4-hydroxyphenylpropionyl)-hexamethylenediamine
N,N'-di-(3,5-di-tert-butyl-4-hydroxyphenylpropionyl)-trimethylenediamine
N,N'-di-(3,5-di-tert-butyl-4-hydroxyphenylpropionyl)-hydrazine 2. UV Absorbers and Light Stabilizers 2.1. 2-(2'-Hydroxyphenyl)-benzotriazoles, for example, the 5'-methyl-, 3',5'-di-tert-butyl-, 5'-tert-butyl-, 5'-(1,1,3,3-tetramethylbutyl)-, 5-chloro-3',5'-di-tert-butyl-, 5-chloro-3'-tert-butyl-5'-methyl-, 3'-sec-butyl-5'-tert-butyl-, 4'-octoxy, 3',5'-di-tert-amyl-, 3',5'-bis-(α,α-dimethylbenzyl), 3'-tert-butyl-5'-(2-(omega-hydroxy-octa-(ethyleneoxy)carbonyl-ethyl)-, 3'-dodecyl-5'-methyl-, and 3'-tert-butyl-5'-(2-octyloxycarbonyl)ethyl-, and dodecylated-5'-methyl derivatives.

2.2. 2-Hydroxy-benzophenones, for example, the 4-hydroxy-, 4-methoxy-, 4-octoxy, 4-decyloxy-, 4-dodecyloxy-, 4-benzyloxy, 4,2',4'-trihydroxy- and 2'-hydroxy-4,4'-dimethoxy derivatives.

2.3. Esters of Optionally Substituted Benzoic Acids for example, phenyl salicylate, 4-tert-butylphenyl salicylate, octylphenyl salicylate, dibenzoylresorcinol, bis-(4-tert-butylbenzoyl)-resorcinol, benzoylresorcinol, 3,5-di-tert-butyl-4-hydroxybenzoic acid 2,4-di-tert-butylphenyl ester and 3,5-di-tert-butyl-4-hydroxybenzoic acid hexadecyl ester.

2.4. Acrylates and Malonates, for example, α-cyano-β,β-diphenylacrylic acid ethyl ester or isooctyl ester, α-carbomethoxy-cinnamic acid methyl ester, α-cyano-β-methyl-p-methoxy-cinnamic acid methyl ester or butyl ester, α-carbomethoxy-p-methoxy-cinnamic acid methyl ester, N-(β-carbomethoxy-β-cyanovinyl)-2-methyl-indoline, Sanduvor® PR25, dimethyl p-methoxybenzylidenemalonate (CAS# 7443-25-6), and Sanduvor® PR31, di-(1,2,2,6,6-pentamethylpiperidin-4-yl) p-methoxybenzylidenemalonate (CAS #147783-69-5).

2.5. Sterically Hindered Amines, for example bis-(2,2,6,6-tetramethylpiperidyl) sebacate, bis-(1,2,2,6,6-pentamethylpiperidyl) sebacate, n-butyl-3,5-di-tertbutyl-4-hydroxybenzyl malonic acid bis-(1,2,2,6,6-pentanemethylpiperidyl)ester, condensation product of 1-hydroxyethyl-2,2,6,6-tetramethyl-4-hydroxypiperidine and succinic acid, condensation product of N,N'-(2,2,6,6-tetramethylpiperidyl)-hexamethylenediamine and 4-tert-octylamino-2,6-dichloro-s-triazine, tris-(2,2,6,6-tetramethylpiperidyl)-nitrilotriacetate, tetrakis-(2,2,6,6-tetramethyl-4-piperidyl) 1,2,3,4-butanetetracarboxylate, 1,1'(1,2-ethanediyl)-bis-(3,3,5,5-tetramethylpiperazinone), bis(1-octyloxy-2,2,6,6-tetramethylpiperidin-4-yl) sebacate.

2.6. Sterically Hindered Amines Substituted on the N-atom by a Hydroxy-substituted Alkoxy Group,
for example compounds disclosed in copending application Ser. No. 09/257,711, and whose relevant parts are also incorporated herein by reference, such as 1-(2-hydroxy-2-methylpropoxy)-4-octadecanoyloxy-2,2,6,6-tetramethylpiperidine, 1-(2-hydroxy-2-methylpropoxy)-4-hydroxy-2,2,6,6-tetramethylpiperidine, 1-(2-hydroxy-2-methylpropoxy)-4-oxo-2,2,6,6-tetramethylpiperidine, bis(1-(2-hydroxy-2-methylpropoxy)-2,2,6,6-tetramethylpiperidin-4-yl) sebacate, bis(1-(2-hydroxy-2-methylpropoxy)-2,2,6,6-tetramethylpiperidin-4-yl) adipate, bis(1-(2-hydroxy-2-methylpropoxy)-2,2,6,6-tetramethylpiperidin-4-yl) succinate, bis(1-(2-hydroxy-2-methylpropoxy)-2,2,6,6-tetramethylpiperidin-4-yl) glutarate and 2,4-bis{N-[1-(2-hydroxy-2-methylpropoxy)-2,2,6,6-tetramethylpiperidin-4-yl]-N-butylamino}-6-(2-hydroxyethylamino)-s-triazine.

2.7. Oxalic Acid Diamides,
for example, 4,4'-di-octyloxy-oxanilide, 2,2'-di-octyloxy-5,5'-di-tert-butyl-oxanilide, 2,2'-di-dodecyloxy-5,5'-di-tert-butyl-oxanilide, 2-ethoxy-2'-ethyl-oxanilide, N,N'-bis(3-dimethylaminopropyl)-oxalamide, 2-ethoxy-5-tert-butyl-2'-ethyloxanilide and its mixture with 2-ethoxy-2'-ethyl-5,4'-di-tert-butyloxanilide and mixtures of ortho- and para-methoxy- as well as of o- and p-ethoxy-disubstituted oxanilides.

2.8. Hydroxyphenyl-s-triazines,
for example 2,6-bis-(2,4-dimethylphenyl)-4-(2-hydroxy-4-octyloxyphenyl)-s-triazine; 2,6-bis-(2,4-dimethylphenyl)-4-(2,4-dihydroxyphenyl)-s-triazine; 2,4-bis(2,4-dihydroxyphenyl)-6-(4-chlorophenyl)-s-triazine; 2,4-bis[2-hydroxy-4-(2-hydroxy-ethoxy)phenyl]-6-(4-chlorophenyl)-s-triazine; 2,4-bis[2-hydroxy-4-(2-hydroxy-4-(2-hydroxy-ethoxy)phenyl]-6-(2,4-dimethylphenyl)-s-triazine; 2,4-bis[2-hydroxy-4-(2-hydroxyethoxy)-phenyl]-6-(4-bromophenyl)-s-triazine; 2,4-bis[2-hydroxy-4-(2-acetoxyethoxy)phenyl]-6-(4-chlorophenyl)-s-triazine, 2,4-bis(2,4-dihydroxyphenyl)-6-(2,4-dimethylphenyl)-s-triazine.

3. Phosphites and Phosphonites,
for example, triphenyl phosphite, diphenylalkyl phosphites, phenyldialkyl phosphites, tri-(nonylphenyl) phosphite, trilauryl phosphite, trioctadecyl phosphite, di-stearyl-pentaerythritol diphosphite, tris-(2,4-di-tert-butylphenyl) phosphite, di-iso-decylpentaerythritol diphosphite, di-(2,4,6-tri-tert-butylphenyl)-pentaerythritol diphosphite, di-(2,4-di-tert-butyl-6-methylphenyl)-pentaerythritol diphosphite, di-(2,4-di-tert-butylphenyl)pentaerythritol diphosphite, tristearyl-sorbitol triphosphite, tetrakis-(2,4-di-tert-butylphenyl) 4,4'-diphenylylenediphosphonite.

4. Compounds Which Destroy Peroxide,
for example, esters of β-thiodipropionic acid, for example the lauryl, stearyl, myristyl or tridecyl esters, mercaptobenzimidazole or the zinc salt of 2-mercaptobenzimidazole, zinc dibutyl-dithiocarbamate, dioctadecyl disulfide, pentaerythritol tetrakis-(β-dodecylmercapto)-propionate.

5. Hydroxylamines,
for example, N,N-dibenzylhydroxylamine, N,N-diethylhydroxylamine, N,N-dioctylhydroxylamine, N,N-dilaurylhydroxylamine, N,N-ditetradecylhydroxylamine, N,N-dihexadecylhydroxylamine, N,N-dioctadecylhydroxylamine, N-hexadecyl-N-octadecylhydroxylamine, N-heptadecyl-N-octadecylhydroxylamine, N,N-dialkylhydroxylamine derived from hydrogenated tallow amine.

6. Nitrones,
for example, N-benzyl-alpha-phenyl nitrone, N-ethyl-alpha-methyl nitrone, N-octyl-alpha-heptyl nitrone, N-lauryl-alpha-undecyl nitrone, N-tetradecyl-alpha-tridecyl nitrone, N-hexadecyl-alpha-pentadecyl nitrone, N-octadecyl-alpha-heptadecylnitrone, N-hexadecyl-alpha-heptadecyl nitrone, N-octadecyl-alpha-pentadecyl nitrone, N-heptadecyl-alpha-heptadecyl nitrone, N-octadecyl-alpha-hexadecyl nitrone, nitrone derived from N,N-dialkylhydroxylamine derived from hydrogenated tallow amine.

7. Amine Oxides,
for example amine oxide derivatives as disclosed in U.S. Pat. Nos. 5,844,029 and 5,880,191, didecyl methyl amine oxide, tridecyl amine oxide, tridodecyl amine oxide and trihexadecyl amine oxide.

8. Polyamide Stabilizers,
for example copper salts in combination with iodides and/or phosphorus compounds and salts of divalent manganese.

9. Basic Co-stabilizers,
for example, melamine, polyvinylpyrrolidone, dicyandiamide, triallyl cyanurate, urea derivatives, hydrazine derivatives, amines, polyamides, polyurethanes, alkali metal salts and alkaline earth metal salts of higher fatty acids for example Ca stearate, Zn stearate, Mg stearate, Na ricinoleate and K palmitate, antimony pyrocatecholate or zinc pyrocatecholate.

10. Nucleating Agents,
for example, 4-tert-butyl-benzoic acid, adipic acid, diphenylacetic acid.

11. Fillers and Reinforcing Agents,
for example, calcium carbonate, silicates, glass fibers, asbestos, talc, kaolin, mica, barium sulfate, metal oxides and hydroxides, carbon black, graphite.

12. Other additives,
for example, plasticizers, lubricants, emulsifiers, pigments, optical brighteners, flameproofing agents, anti-static agents, blowing agents and thiosynergists such as dilauryl thiodipropionate or distearyl thiodipropionate.

13. Benzofuranones and Indolinones,
for example those disclosed in U.S. Pat. Nos. 4,325,863, 4,338,244 or 5,175,312, or 3-[4-(2-acetoxyethoxy)phenyl]-5,7-di-tert-butyl-benzofuran-2-one, 5,7-di-tert-butyl-3-[4-(2-stearoyloxyethoxy)phenyl]benzofuran-2-one, 3,3'-bis[5,7-di-tert-butyl-3-(4-[2-hydroxyethoxy]phenyl)benzofuran-2-one], 5,7-di-tert-butyl-3-(4-ethoxyphenyl)benzofuran-2-one, 3-(4-acetoxy-3,5-dimethylphenyl)-5,7-di-tert-butyl-benzofuran-2-one, 3-(3,5-dimethyl-4-pivaloyloxyphenyl)-5,7-di-tert-butyl-benzofuran-2-one.

The co-stabilizers, with the exception of the benzofuranones listed under 13., are added for example in concentrations of about 0.01 to about 10%, relative to the total weight of the material to be stabilized.

Further preferred compositions comprise, in addition to components (a) and (b) further additives, in particular phenolic antioxidants, light stabilizers or processing stabilizers.

Particularly preferred additives are phenolic antioxidants, sterically hindered amines, phosphites and phosphonites, UV absorbers and peroxide-destroying compounds.

Additional additives (stabilizers) which are also particularly preferred are benzofuran-2-ones, such as described, for example, in U.S. Pat. Nos. 4,325,863, 4,338,244 or 5,175,312.

The phenolic antioxidant of particular interest is selected from the group consisting of n-octadecyl 3,5-di-tert-butyl-4-hydroxyhydrocinnamate, neopentanetetrayl tetrakis(3,5-di-tert-butyl-4-hydroxyhydrocinammate), di-n-octadecyl 3,5-di-tert-butyl-4-hydroxybenzylphosphonate, 1,3,5-tris(3,5-di-tert-butyl-4-hydroxybenzyl)isocyanurate, thiodiethylene bis(3,5-di-tert-butyl-4-hydroxyhydrocinnamate), 1,3,5-trimethyl-2,4,6-tris(3,5-di-tert-butyl-4-hydroxybenzyl)benzene, 3,6-dioxaoctamethylene bis(3-methyl-5-tert-butyl-4-hydroxyhydrocinnamate), 2,6-di-tert-butyl-p-cresol, 2,2'-ethylidene-bis(4,6-di-tert-butylphenol), 1,3,5-tris(2,6-dimethyl-4-tert-butyl-3-hydroxybenzyl)isocyanurate, 1,1,3,-tris(2-methyl-4-hydroxy-5-tert-butylphenyl)butane, 1,3,5-tris[2-(3,5-di-tert-butyl-4-hydroxyhydrocinnamoyloxy)ethyl]isocyanurate, 3,5-di-(3,5-di-tert-butyl-4-hydroxybenzyl)mesitol, hexamethylene bis(3,5-di-tert-butyl-4-hydroxyhydrocinnamate), 1-(3,5-di-tert-butyl-4-hydroxyanilino)-3,5-di(octylthio)-s-triazine, N,N'-hexamethylene-bis(3,5-di-tert-butyl-4-hydroxyhydrocinnamamide), calcium bis(ethyl 3,5-di-tert-butyl-4-hydroxybenzyl-phosphonate), ethylene bis[3,3-di(3-tert-butyl-4-hydroxyphenyl)butyrate], octyl 3,5-di-tert-butyl-4-hydroxybenzylmercaptoacetate, bis(3,5-di-tert-butyl-4-hydroxyhydrocinnamoyl)hydrazide, N,N'-bis[2-(3,5-di-tert-butyl-4-hydroxyhydrocinnamoyloxy)-ethyl]-oxamide, 2,4-bis(octylthio-methyl)-6-methylphenol, and 2,4-bis(octylthiomethyl)-6-tert-butylphenol.

A most preferred phenolic antioxidant is neopentanetetrayl tetrakis(3,5-di-tert-butyl-4-hydroxyhydrocinnamate), n-octadecyl 3,5-di-tert-butyl-4-hydroxyhydrocinnamate, 1,3,5-tri-methyl-2,4,6-tris(3,5-di-tert-butyl-4-hydroxybenzyl)benzene, 1,3,5-tris(3,5-di-tert-butyl-4-hydroxybenzyl)isocyanurate, 2,6-di-tert-butyl-p-cresol, 2,2'-ethylidene-bis(4,6-di-tert-butylphenol), 2,4-bis(octylthiomethyl)-6-methylphenol or 2,4-bis(octylthiomethyl)-6-tert-butyl-phenol.

The hindered amine compound of particular interest is selected from the group consisting of bis(2,2,6,6-tetramethylpiperidin-4-yl) sebacate, bis(1,2,2,6,6-pentamethylpiperidin-4-yl) sebacate, di(1,2,2,6,6-pentamethylpiperidin-4-yl) (3,5-di-tert-butyl-4-hydroxybenzyl)-butylmalonate, 4-benzoyl-2,2,6,6-tetramethylpiperidine, 4-stearyloxy-2,2,6,6-tetramethyl-piperidine, 3-n-octyl-7,7,9,9-tetramethyl-1,3,8-triaza-spiro[4.5]decane-2,4-dione, tris(2,2,6,6-tetramethylpiperidin-4-yl) nitrilotriacetate, 1,2-bis(2,2,6,6-tetramethyl-3-oxopiperazin-4-yl)ethane, 2,2,4,4-tetramethyl-7-oxa-3,20-diaza-21-oxodispiro[5.1.11.2] heneicosane, polycondensation product of 2,4-dichloro-6-tert-octylamino-s-triazine and 4,4'-hexamethylenebis(amino-2,2,6,6-tetramethylpiperidine), polycondensation product of 1-(2-hydroxyethyl)-2,2,6,6-tetramethyl-4-hydroxypiperidine and succinic acid, polycondensation product of 4,4'-hexamethylenebis-(amino-2,2,6,6-tetramethylpiperidine) and 1,2-dibromoethane, tetrakis(2,2,6,6-tetramethylpiperidin-4-yl) 1,2,3,4-butanetetracarboxylate, tetrakis(1,2,2,6,6-pentamethylpiperidin-4-yl) 1,2,3,4-butanetetracarboxylate, polycondensation product of 2,4-dichloro-6-morpholino-s-triazine and 4,4'-hexamethylenebis(amino-2,2,6,6-tetramethylpiperidine), N,N',N'',N'''-tetrakis[(4,6-bis(butyl-1,2,2,6,6-pentamethylpiperidin-4-yl)-amino-s-triazin-2-yl]-1,10-diamino-4,7-diazadecane, mixed [2,2,6,6-tetramethylpiperidin-4-yl-β,β,β',β'-tetramethyl-3,9-(2,4,8,10-tetraoxaspiro[5.5]-undecane) diethyl] 1,2,3,4-butanetetracarboxylate, mixed [1,2,2,6,6-pentamethylpiperidin-4-yl/β,β,β',β'-tetramethyl-3,9-(2,4,8,10-tetraoxaspiro[5,5]undecane)diethyl] 1,2,3,4-butanetetracarboxylate, octamethylene bis(2,2,6,6-tetramethylpiperidin-4-carboxylate), 4,4'-ethylenebis(2,2,6,6-tetramethylpiperazin-3-one), N-2,2,6,6-tetramethylpiperidin-4-yl-n-dodecylsuccinimide, N-1,2,2,6,6-pentamethyl-piperidin-4-yl-n-dodecylsuccinimide, N-1-acetyl-2,2,6,6-tetramethylpiperidin-4-yl-dodecylsuccinimide, 1-acetyl3-dodecyl-7,7,9,9-tetramethyl-1,3,8-triazaspiro[4.5]decane-2,4-dione, di-(1-octyloxy-2,2,6,6-tetramethylpiperidin-4-yl) sebacate, di-(1-cyclohexyloxy-2,2,6,6-tetramethylpiperidin-4-yl) succinate, 1-octyloxy-2,2,6,6-tetramethyl-4-hydroxy-piperidine, poly-{[6-tert-octylamino-s-triazin-2,4-diyl][2-(1-cyclohexyloxy-2,2,6,6-tetramethylpiperidin-4-yl)imino-hexamethylene-[4-(1-cyclohexyloxy-2,2,6,6-tetramethylpiperidin-4-yl)imino], 2,4,6-tris[N-(1-cyclohexyloxy-2,2,6,6-tetramethylpiperidin-4-yl)-n-butylamino]-s-triazine, 2-(2-hydroxyethyl)amino-4,6-bis[N-(1-cyclohexyloxy-2,2,6,6-tetramethylpiperidin-4-yl)-n-butyl-amino]-s-triazine, 1,2-bis(3,3,5,5-tetramethylpiperazin-2-on-1-yl)ethane, 1,3,5-tris {N-cyclohexyl-N-[2-(3,3,5,5-tetramethylpiperazin-2-on-1-yl)ethyl]amino}-s-triazine, 1,3,5-tris {N-cyclohexyl-N-[2-(3,3,4,5,5-pentaamethylpiperazin-2-on-1-yl)ethyl]amino}-s-triazine, reaction of 2–4 equivalents of 2,4-bis[(1-cyclohexyloxy-2,2,6,6-tetramethylpiperidin-4-yl) butylamino]-6-chloro-s-triazine with 1 equivalent of N,N-bis(3-aminopropyl)ethylene-diamine, bis[1-(2-hydroxy-2-methylpropoxy)-2,2,6,6-tetramethylpiperidin-4-yl] sebacate, mixture of bis[1-(2-hydroxy-2-methylpropoxy)-2,2,6,6-tetramethylpiperidin-4-yl] glutarate and bis[1-(2-hydroxy-2-methylpropoxy)-2,2,6,6-tetramethylpiperidin-4-yl] adipate, 4-hydroxy-1-(2-hydroxy-2-methylpropoxy)-2,2,6,6-tetramethylpiperidine and 4-octadecyloxy-1-(2-hydroxy-2-methylpropoxy)-2,2,6,6-tetramethylpiperidine.

A most preferred hindered amine compound is bis(2,2,6,6-tetramethylpiperidin-4-yl) sebacate, bis(1,2,2,6,6-pentamethylpiperidin-4-yl) sebacate, di(1,2,2,6,6-pentamethylpiperidin-4-yl) (3,5-di-tert-butyl-4-hydroxybenzyl)butylmalonate, the polycondensation product of 1-(2-hydroxyethyl)-2,2,6,6-tetramethyl-4-hydroxypiperidine and succinic acid, the polycondensation product of 2,4-dichloro-6-tert-octylamino-s-triazine and 4,4'-hexamethylenebis(amino-2,2,6,6-tetramethylpiperidine), N,N',N'',N'''-tetrakis[(4,6-bis(butyl-(1,2,2,6,6-pentamethylpiperidin-4-yl)amino)-s-triazine-2-yl]-1,10-diamino-4,7-diazadecane di-(1-octyloxy-2,2,6,6-tetramethyl-piperidin-4-yl) sebacate, di-(1-cyclohexyloxy-2,2,6,6-tetramethylpiperidin-4-yl) succinate, 1-octyloxy-2,2,6,6-tetramethyl-4-hydroxy-piperidine, poly-{[6-tert-octylamino-s-triazin-2,4-diyl][2-(1-cyclohexyloxy-2,2,6,6-tetramethylpiperidin-4-yl)imino-hexamethylene-[4-(1-cyclohexyloxy-2,2,6,6-tetramethylpiperidin-4-yl)imino], 2,4,6-tris[N-(1-cyclohexyloxy-2,2,6,6-tetramethylpiperidin-4-yl)-n-butylamino]-s-triazine, 2-(2-hydroxyethyl)amino-4,6-bis[N-(1-cyclohexyloxy-2,2,6,6-tetramethylpiperidin-4-yl)-n-butylamino]-s-triazine, 1,2-bis(3,3,5,5-tetramethylpiperazin-2-on-1-yl)ethane, 1,3,5-tris {N-cyclohexyl-N-[2-(3,3,5,5-tetramethylpiperazin-2-on-1-yl)ethyl]amino}-s-triazine, 1,3,5-tris {N-cyclohexyl-N-[2-(3,3,4,5,5-pentaamethyl-piperazin-2-on-1-yl)ethyl]amino}-s-triazine, reaction of 2-4 equivalents of 2,4-bis[(1-cyclohexyl-oxy-2,2,6,6-tetramethylpiperidin-4-yl) butylamino]-6-chloro-s-triazine with 1 equivalent of N,N'- bis(3-aminopropyl)ethylenediamine, bis[1-(2-hydroxy-2-methylpropoxy)-2,2,6,6-tetramethyl-piperidin-4-yl] adipate, 4-hydroxy-1-(2-hydroxy-2-methylpropoxy)-2,2,6,6-tetramethylpiperidine or 4-octadecyloxy-1-(2-hydroxy-2-methylpropoxy)-2,2,6,6-tetramethylpiperidine.

The instant composition can additionally contain another UV absorber selected from the group consisting of benzotriazoles, s-triazines, oxanilides, hydroxybenzophenones, benzoates, α-cyanoacrylates, malonates, salicylates, and benzoxazinones 2,2'-p-phenylene-bis(3,1-benzoxazin-4-one), Cyasorb® 3638 (CAS# 18600-59-4), Cytec Corp.

Of particular interest as optional co-additives in the present compositions are those selected from the classes of known benzotriazole UV absorbers and hindered amine compounds.

The following examples are for illustrative purposes only and are not to be construed to limit the instant invention in any manner whatsoever.

The following additives are used in the working Examples:

Tinuvin® 327, 5-chloro-2-(2-hydroxy-3,5-di-tert-butylphenyl)-2H-benzotriazole,

Chimassorb® 81, 2-hydroxy-4-octyloxybenzophenone, and

Tinuvin® 928, 3-α-cumyl-2-hydroxy-5-t-octylphenyl-2H-benzotriazole and (a) 5-trifluoromethyl-2-(2-hydroxy-3-α-cumyl-5-tert-octylphenyl)-2H-benzotriazole.

Tinuvin® 327, Chimassorb® 81 and Tinuvin® 928 are available from Ciba Specialty Chemicals.

EXAMPLE 1

PET Bottles

PET concentrates (10% by weight) of the UV-absorbers of Table 1 are prepared using Eastapak 9921W PET, on a 27 mm twin screw extruder at an operating temperature at die of 275° C. The concentrates are letdown with base resin to the final additive loading indicated in Table 1. PET is dried in vacuo for at least 4 hours at 240° F. prior to preform molding. Preforms are molded on a unit cavity Arburg press using the minimum injection temperature and back pressure necessary to obtain parts free of haze an crystallinity. Bottle blow molding is conducted using a Sidel SBO ⅔ blow molding machine, using preforms described above. Bottle wall thickness of 0.015–0.016 inches is achieved.

TABLE 1

| Formulation | UV Absorber | weight % on resin |
|---|---|---|
| 1 (control) | none | |
| 2 (control) | Tinuvin ® 327 | 0.3 |
| 3 (control) | Chimassorb ® 81 | 0.3 |
| 4 | UVA (a) | 0.3 |
| 5 | 1:1 mix of Tinuvin ® 928 and UVA (a) | 0.3 |

The molded bottles represent 16–20 oz. water or soda type PET bottles and 200 mL cough syrup type PET bottles.

EXAMPLE 2

Percent Transmission

Percent transmission data is obtained for 200 mL cough syrup bottles prepared according to Example 1. Percent transmission is measured for bottles prepared from formulations 1 and 5 and reported in the following table.

| Wavelength (nm) | Formulation 1 | Formulation 5 |
|---|---|---|
| 330 | 25 | 0 |
| 340 | 41 | 0 |
| 350 | 50 | 0 |
| 360 | 57 | 0 |
| 370 | 67 | 0 |
| 380 | 71 | 0 |
| 390 | 73 | 0 |

Essentially all the damaging UV light is screened with the bottles which have incorporated therein a small amount of UV absorber (a) of the present invention.

For the following Examples the exposure conditions are as follows:

Samples are exposed under a bank of six (6) cool white fluorescent lamps (40 watts) or under a bank of six (6) UV lamps having a wavelength of 368 nm with the test samples being twelve (12) inches (30.48 cm) below the lamps.

Dye color fade (or color change) is measured by a Macbeth ColorEye Spectrophotometer with a 6 inch integrating sphere. The conditions are: 10 degree observer; D65 illuminant and 8 degree viewing angle.

Initial color measurements are taken using the above parameters. The L, a and b values are calculated using the CIE system from the reflectance values. YI is calculated from the L, a and b values. Subsequent measurements are taken at specified intervals. Delta L, a, b and YI values are simply the difference between the initial values and the values at each interval. Delta ($\Delta$) E is calculated as follows: $[(\Delta L)^2+(\Delta a)^2+(\Delta b)^2]^{1/2}=\Delta E$ A low $\Delta E$ indicates less change in color and is highly desirable.

EXAMPLE 3

Color Stabilization of Commercial Mouthwash

The commercial mouthwash is Listerine® Tartar Control antiseptic mouthwash, U.S. Pat. No. 5,891,422, which contains F & DC Blue #1 (Warner-Lambert Consumer Healthcare). The color change of the mouthwash contained in 16 oz. PET bottles prepared according to Example 1 is measured after exposure to fluorescent light. The bottles are filled to ¾ full (500 g of mouthwash) and the lids are securely fastened. The bottles are exposed as above. Delta E is measured for bottles prepared from formulations 1, 2 and 4.

| Formulation | $\Delta$ E after 2 days |
|---|---|
| 2 | 1.28 |
| 4 | 1.01 |

These data indicate that PET bottles which have incorporated therein a UV absorber of the present invention, protects the contents from unwanted discoloration far better than a conventional UV absorber.

EXAMPLE 4

Color Stabilization of Commercial Mouthwash

The commercial mouthwash is Listerine® Tartar Control antiseptic mouthwash, U.S. Pat. No. 5,891,422, which contains F & DC Blue #1 (Warner-Lambert Consumer Healthcare). The color change of the mouthwash contained in 16 oz. PET bottles prepared according to Example 1 is measured after exposure to ultraviolet (UV) light. The bottles are filled to ¾ full (500 g of mouthwash) and the lids are securely fastened. The bottles are exposed as above. Delta E is measured for bottles prepared from formulations 1, 2 and 4.

| Formulation | Δ E after 1 day |
|---|---|
| 1 | 0.68 |
| 2 | 0.67 |
| 4 | 0.60 |

These data indicate that PET bottles which have incorporated therein a UV absorber of the present invention, protects the contents from unwanted discoloration far better than a conventional UV absorber.

EXAMPLE 5

Color Stabilization of an Aqueous Dye Solution

The commercial dye is Fast Green FCF (C.I. 42053; Food Green 3), purchased from Sigma-Aldrich. The color change of the solutions in 16 oz. PET bottles prepared according to Example 1 is measured after exposure to fluorescent light. The bottles are filled to ¾ full with 500 g of a 2 ppm aqueous dye solution and the lids are securely fastened. The bottles are exposed as above. Delta E is measured for bottles prepared from formulations 1, 2 and 4.

| Formulation | Δ E after 1 day |
|---|---|
| 1 | 0.67 |
| 2 | 0.45 |
| 4 | 0.35 |

These data indicate that PET bottles which have incorporated therein a UV absorber of the present invention, protects the contents from unwanted discoloration far better than a conventional UV absorber.

EXAMPLE 6

Color Stabilization of an Aqueous Dye Solution

The commercial dye is Fast Green FCF (C.I. 42053; Food Green 3), purchased from Sigma-Aldrich. The color change of the solutions in 16 oz. PET bottles prepared according to Example 1 is measured after exposure to ultraviolet (UV) light. The bottles are filled to ¾ full with 500 g of a 2 ppm aqueous dye solution and the lids are securely fastened. The bottles are exposed as above. Delta E is measured for bottles prepared from formulations 1, 2 and 4.

| Formulation | Δ E after 4 days |
|---|---|
| 1 | 2.34 |
| 4 | 2.03 |

These data indicate that PET bottles which have incorporated therein a UV absorber of the present invention, protects the contents from unwanted discoloration far better than a conventional UV absorber.

EXAMPLE 7

Color Stabilization of a Commercial Shampoo

The commercial shampoo is Suave® Strawberry Shampoo which contains D&C Orange #4 (C.I. 15510) and D&C Red #33 (C.I. 17200). The color change of the shampoo in 16 oz. PET bottles prepared according to Example 1 is measured after exposure to fluorescent light. The bottles are filled to ¾ fill with 500 g of the shampoo and the lids are securely fastened. The bottles are exposed as above. Delta E is measured for bottles prepared from formulations 1, 2 and 4.

| Formulation | Δ E after 4 days |
|---|---|
| 1 | 1.76 |
| 2 | 1.21 |
| 4 | 1.12 |

These data indicate that PET bottles which have incorporated therein a UV absorber of the present invention, protects the contents from unwanted discoloration far better than a conventional UV absorber.

EXAMPLE 8

Color Stabilization of a Commercial Shampoo

The commercial shampoo is Suave® Strawberry Shampoo which contains D&C Orange #4 (C.I. 15510) and D&C Red #33 (C.I. 17200). The color change of the shampoo in 16 oz. PET bottles prepared according to Example 1 is measured after exposure to ultraviolet (UV) light. The bottles are filled to ¾ full with 500 g of the shampoo and the lids are securely fastened. The bottles are exposed as above. Delta E is measured for bottles prepared from formulations 1, 2 and 4.

| Formulation | Δ E after 4 days |
|---|---|
| 1 | 3.73 |
| 4 | 1.34 |

These data indicate that PET bottles which have incorporated therein a UV absorber of the present invention, protects the contents from unwanted discoloration far better than a conventional UV absorber.

EXAMPLE 9

Color Stabilization of Commercial Mouthwash

The commercial mouthwash is Listerine® Tartar Control antiseptic mouthwash, U.S. Pat. No. 5,891,422, which contains F & DC Blue #1 (Warner-Lambert Consumer Healthcare). The color change of the mouthwash contained in 200 mL bottles prepared according to Example 1 is measured after exposure to fluorescent light. The bottles are filled to ¾ full (140 g of mouthwash) and the lids are securely fastened. The bottles are exposed as above. Delta E is measured for bottles prepared from formulations 1, 2, 3 and 5.

| Formulation | Δ E after 3 days |
|---|---|
| 1 | 0.96 |
| 2 | 0.73 |
| 3 | 0.56 |
| 5 | 0.45 |

These data indicate that PET bottles which have incorporated therein a UV absorber of the present invention, protects the contents from unwanted discoloration far better than a conventional UV absorber.

EXAMPLE 10

Color Stabilization of Commercial Mouthwash

The commercial mouthwash is Listerine® Tartar Control antiseptic mouthwash, U.S. Pat. No. 5,891,422, which contains F & DC Blue #1 (Warner-Lambert Consumer Healthcare). The color change of the mouthwash contained in 200 mL bottles prepared according to Example 1 is measured after exposure to ultraviolet (UV) light. The bottles are filled to ¾ full (140 g of mouthwash) and the lids are securely fastened. The bottles are exposed as above. Delta E is measured for bottles prepared from formulations 1, 2, 3 and 5.

| Formulation | Δ E after 4 days |
|---|---|
| 1 | 0.61 |
| 3 | 1.52 |
| 5 | 0.36 |

These data indicate that PET bottles which have incorporated therein a UV absorber of the present invention, protects the contents from unwanted discoloration far better than a conventional UV absorber.

EXAMPLE 11

Color Stabilization of an Aqueous Dye Solution

The commercial dye is Erioglaucine (blue dye), purchased from Sigma-Aldrich. The color change of the aqueous solution contained in 200 mL bottles prepared according to Example 1 is measured after exposure to ultraviolet (UV) light. The bottles are filled to ¾ full with a 2 ppm aqueous dye solution (140 g of solution) and the lids are securely fastened. The bottles are exposed as above. Delta E is measured for bottles prepared from formulations 1, 2, 3 and 5.

| Formulation | Δ E after 1 day |
|---|---|
| 1 | 0.15 |
| 2 | 0.26 |
| 3 | 0.33 |
| 5 | 0.12 |

These data indicate that PET bottles which have incorporated therein a UV absorber of the present invention, protects the contents from unwanted discoloration far better than a conventional UV absorber.

EXAMPLE 12

Color Stabilization of a Commercial Shampoo

The commercial shampoo is Suave® Strawberry Shampoo which contains D&C Orange #4 (C.I. 15510) and D&C Red #33 (C.I. 17200). The color change of the shampoo contained in 200 mL bottles prepared according to Example 1 is measured after exposure to fluorescent light. The bottles are filled to ¾ full with the shampoo (140 g) and the lids are securely fastened. The bottles are exposed as above. Delta E is measured for bottles prepared from formulations 1, 2, 3 and 5.

| Formulation | Δ E after 4 days |
|---|---|
| 1 | 1.54 |
| 2 | 1.31 |
| 3 | 1.47 |
| 5 | 1.26 |

These data indicate that PET bottles which have incorporated therein a UV absorber of the present invention, protects the contents from unwanted discoloration far better than a conventional UV absorber.

EXAMPLE 13

Color Stabilization of a Commercial Shampoo

The commercial shampoo is Suave® Strawberry Shampoo which contains D&C Orange #4 (C.I. 15510) and D&C Red #33 (C.I. 17200). The color change of the shampoo contained in 200 mL bottles prepared according to Example 1 is measured after exposure to ultraviolet (UV) light. The bottles are filled to ¾ full with the shampoo (140 g) and the lids are securely fastened. The bottles are exposed as above. Delta E is measured for bottles prepared from formulations 1, 2, 3 and 5.

| Formulation | Δ E after 2 days |
|---|---|
| 1 | 4.47 |
| 2 | 0.97 |
| 3 | 1.57 |
| 5 | 0.84 |

These data indicate that PET bottles which have incorporated therein a UV absorber of the present invention, protects the contents from unwanted discoloration far better than a conventional UV absorber.

EXAMPLE 14

Color Stabilization of an Aqueous Dye Solution

The commercial dye is Tartrazine (C.I. 19140, Acid Yellow 23), purchased from Sigma-Aldrich. The color change of the aqueous solution contained in 200 mL bottles prepared according to Example 1 is measured after exposure to fluorescent light. The bottles are filled to ¾ full with a 3 ppm aqueous dye solution (140 g of solution) and the lids are securely fastened. The bottles are exposed as above. Delta E is measured for bottles prepared from formulations 1, 2, 3 and 5.

| Formulation | Δ E after 4 days |
|---|---|
| 1 | 0.20 |
| 2 | 0.18 |
| 3 | 0.28 |
| 5 | 0.13 |

These data indicate that PET bottles which have incorporated therein a UV absorber of the present invention, protects the contents from unwanted discoloration far better than a conventional UV absorber.

EXAMPLE 15

Color Stabilization of an Aqueous Dye Solution

The commercial dye is Tartrazine (C.I. 19140, Acid Yellow 23), purchased from Sigma-Aldrich. The color change of the aqueous solution contained in 200 mL bottles prepared according to Example 1 is measured after exposure to ultraviolet (UV) light. The bottles are filled to a ¾ full with a 3 ppm aqueous dye solution (140 g of solution) and the lids are securely fastened. The bottles are exposed as above. Delta E is measured for bottles prepared from formulations 1, 2, 3 and 5.

| Formulation | Δ E after 1 day |
|---|---|
| 1 | 0.84 |
| 3 | 0.58 |
| 5 | 0.50 |

These data indicate that PET bottles which have incorporated therein a UV absorber of the present invention, protects the contents from unwanted discoloration far better than a conventional UV absorber.

EXAMPLE 16

To separate poly(ethylene terephthalate), PET, resin formulations are added 0.5% by weight of each of the following benzotriazole stabilizers:
 (ee) 5-chloro-2-(2-hydroxy-3-α-cumyl-5-tert-octylphenyl)-2H-benzotriazole;
 (ff) isooctyl 3-(5-chloro-2H-benzotriazol-2-yl)-5-tert-butyl-4-hydroxyhydrocinnamate;
 (gg) 2-(2-hydroxy-3-α-cumyl-5-tert-octylphenyl)-2H-benzotriazole;
 (a) 5-trifluoromethyl-2-(2-hydroxy-3-α-cumyl-5-tert-octylphenyl)-2H-benzotriazole;
 (b) 5-trifluoromethyl-2-(2-hydroxy-5-tert-octylphenyl)-2H-benzotriazole;
 (c) 5-trifluoromethyl-2-(2-hydroxy-3,5-di-tert-octylphenyl)-2H-benzotriazole;
 (g) methyl 3-(5-trifluoromethyl-2H-benzotriazol-2-yl)-5-tert-butyl-4-hydroxy-hydrocinnamate;
 (j) 5-butylsulfonyl-2-(2-hydroxy-3-α-cumyl-5-tert-octylphenyl)-2H-benzotriazole;
 (n) 5-trifluoromethyl-2-(2-hydroxy-3-α-cumyl-5-tert-butylphenyl)-2H-benzotriazole;
 (s) 5-trifluoromethyl-2-(2-hydroxy-3,5-di-tert-butylphenyl)-2H-benzotriazole;
 (x) 5-trifluoromethyl-2-(2-hydroxy-3,5-di-α-cumylphenyl)-2H-benzotriazole;
 (aa) 5-butylsulfonyl-2-(2-hydroxy-3,5-di-tert-butylphenyl)-2H-benzotriazole; and
 (cc) 5-phenylsulfonyl-2-(2-hydroxy-3,5-di-tert-butylphenyl)-2H-benzotriazole.

Each of the stabilized resin compositions are then blow or injection molded into a PET bottle having incorporated therein each of the UV absorbers. The PET bottles are especially effective at protecting the contents therein from UV radiation, allowing a longer shelf life of the product.

EXAMPLE 17

To separate poly(ethylene terephthalate), PET, resin formulations are added 0.5% by weight of each of the following s-triazine stabilizers:
 (1) 2,4-bis(4-biphenylyl)-6-(2-hydroxy-4-octyloxycarbonylethylideneoxyphenyl)-s-triazine;
 (2) 2-phenyl-4-[2-hydroxy-4-(3-sec-butyloxy-2-hydroxypropyloxy)phenyl]-6-[2-hydroxy-4-(3-sec-amyloxy-2-hydroxypropyloxy)phenyl]-s-triazine;
 (3) 2,4-bis(2,4-dimethylphenyl)-6-[2-hydroxy-4-(3-benzyloxy-2-hydroxypropyloxy)-phenyl]-s-triazine;
 (4) 2,4-bis(2-hydroxy-4-n-butyloxyphenyl)-6-(2,4-di-n-butyloxyphenyl)-s-triazine;
 (5) 2,4-bis(2,4-dimethylphenyl)-6-[2-hydroxy-4-(3-nonyloxy*-2-hydroxypropyloxy)-5-α-cumylphenyl]-s-triazine; (* denotes a mixture of octyloxy, nonyloxy and decyloxy groups)
 (6) methylenebis-{2,4-bis(2,4-dimethylphenyl)-6-[2-hydroxy-4-(3-butyloxy-2-hydroxy-propoxy)phenyl]-s-triazine}, methylene bridged dimer mixture bridged in the 3:5', 5:5' and 3:3' positions in a 5:4:1 ratio;
 (7) 2,4,6-tris(2-hydroxy-4-isooctyloxycarbonylisopropylideneoxyphenyl)-s-triazine;
 (8) 2,4-bis(2,4-dimethylphenyl)-6-(2-hydroxy-4-hexyloxy-5-α-cumylphenyl)-s-triazine;
 (9) 2,4-bis(2,4-dimethylphenyl)-6-(2-hydroxy-4-octyloxyphenyl)-s-triazine, CYASORB® 1164, Cytec;
 (10) 2-(2,4,6-trimethylphenyl)-4,6-bis[2-hydroxy-4-(3-butyloxy-2-hydroxypropyloxy)-phenyl]-s-triazine; and
 (11) 2,4,6-tris[2-hydroxy-4-(3-sec-butyloxy-2-hydroxypropyloxy)phenyl]-s-triazine.

Each of the stabilized resin compositions are then blow or injection molded into a PET bottle having incorporated therein each of the UV absorbers. The PET bottles are especially effective at protecting the contents therein from UV radiation, allowing a longer shelf life of the product.

EXAMPLE 18

A multi-layer bottle is prepared wherein the exterior layer and the innermost layer contacting the contents are composed of PET and which also comprises a barrier layer. When one or more of the benzotriazole or s-triazines listed in Examples 16 and 17 are incorporated into any of the three layers at 0.5% by weight based on the weight of the resin, the contents of the bottle are effectively protected from UV radiation.

EXAMPLE 19

A multi-layer bottle is prepared wherein the exterior layer and the innermost layer contacting the contents are composed of HDPE and which also comprises a barrier layer. When one or more of the benzotriazole or s-triazines listed in Examples 16 and 17 are incorporated into any of the three layers at 0.5% by weight based on the weight of the resin, the contents of the bottle are effectively protected from UV radiation.

EXAMPLE 20

To separate polypropylene resin formulations are added 0.5% by weight of each of the benzotriazole and s-triazine stabilizers of Examples 16 and 17. Each of the stabilized resin compositions are then blow or injection molded into a polypropylene bottle having incorporated therein each of the UV absorbers. The polypropylene bottles are especially effective at protecting the contents therein from UV radiation, allowing a longer shelf life of the product.

What is claimed is:

1. A method of protecting contents against the deleterious effects of ultraviolet radiation, which method comprises storing the contents in a clear or lightly colored rigid plastic container, which container comprises an effective stabilizing amount of one or more compounds selected from the group consisting of the durable hydroxyphenyl benzotriazole UV absorbers, wherein said benzotriazole UV absorbers are of formula (I)

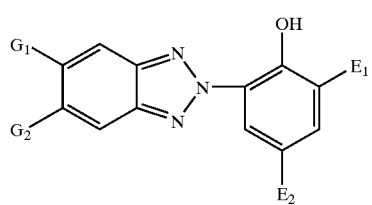

wherein $G_1$ is hydrogen, $G_2$ is $CF_3$—, $E_1$ is phenylalkyl of 7 to 15 carbon atoms, phenyl, or said phenyl or said phenylalkyl substituted on the phenyl ring by 1 to 4 alkyl of 1 to 4 carbon atoms, $E_2$ is straight or branched alkyl chain of 1 to 24 carbon atoms, straight or branched chain alkenyl of 2 to 18 carbon atoms, cycloalkyl of 5 to 12 carbon atoms, phenylalkyl of 7 to 15 carbon atoms, phenyl, or said phenyl or said phenylalkyl substituted on the phenyl ring by 1 to 3 alkyl of 1 to 4 carbon atoms; or $E_2$ is said alkyl of 1 to 24 carbon atoms or said alkenyl of 2 to 18 carbon atoms substituted by one or more —OH, —OCOE$_{11}$, —NH$_2$ or —NHCOE$_{11}$, or mixtures thereof, or said alkyl or said alkenyl interrupted by one or more —O— and which can be unsubstituted or substituted by one or more —OH, or is a compound of formula (I) wherein, $G_1$ is hydrogen, $G_2$ is $CF_3$—, $E_1$ is hydrogen, straight or branched alkyl of 4 to 24 carbon atoms or phenylalkyl of 7 to 15 carbon atoms, and $E_2$ is straight or branched alkyl chain of 1 to 24 carbon atoms, straight or branched chain alkenyl of 2 to 18 carbon atoms, cycloalkyl of 5 to 12 carbon atoms, phenylalkyl of 7 to 15 carbon atoms, phenyl, or said phenyl or said phenylalkyl substituted on the phenyl ring by 1 to 3 alkyl of 1 to 4 carbon atoms; or $E_2$ is said alkyl of 1 to 24 carbon atoms or said alkenyl of 2 to 18 carbon atoms substituted by one or more —OH, —OCOE$_{11}$, —NH$_2$ or —NHCOE$_{11}$, or mixtures thereof, or said alkyl or said alkenyl interrupted by one or more —O— and which can be unsubstituted or substituted by one or more —OH.

2. A method of protecting contents against the deleterious effects of ultraviolet radiation, which method comprises storing the contents in a clear or lightly colored rigid plastic container, which container comprises an effective stabilizing amount of one or more compounds selected from the group consisting of the durable hydroxyphenyl benzotriazole UV absorbers, wherein said benzotriazole UV absorbers are selected from the group consisting of (a) 5-trifluoromethyl-2-(2-hydroxy-3-α-cumyl-5-tert-octylphenyl)-2H-benzotriazole;

(b) 5-trifluoromethyl-2-(2-hydroxy-5-tert-octylphenyl)-2H-benzotriazole;

(c) 5-trifluoromethyl-2-(2-hydroxy-3,5-di-tert-octylphenyl)-2H-benzotriazole;

(d) 2,2'-methylene-bis[6-(5-trifluoromethyl-2H-benzotriazol-2-yl)-4-tert-octylphenol];

(e) methylene-2-[4-tert-octyl-6-(2H-benzotriazol-2-yl)phenol]2'-[4-tert-butyl-6-(5-trifluoromethyl-2H-benzotriazol-2-yl)phenol];

(f) 3-(5-trifluoromethyl-2H-benzotriazol-2-yl)-5-tert-butyl-4-hydroxyhydrocinnamic acid;

(g) methyl 3-(5-trifluoromethyl-2H-benzotriazol-2-yl)-5-tert-butyl-4-hydroxyhydrocinnamate;

(h) isooctyl 3-(5-trifluoromethyl-2H-benzotriazol-2-yl)-5-tert-butyl-4-hydroxyhydrocinnamate;

(i) 5-trifluoromethyl-2-[2-hydroxy-5-(3-hydroxypropyl)phenyl]-2H-benzotriazole;

(j) 5-butylsulfonyl-2-(2-hydroxy-3-α-cumyl-5-tert-octylphenyl)-2H-benzotriazole;

(k) 5-octylsulfonyl-2-(2-hydroxy-3,5-di-α-cumylphenyl)-2H-benzotriazole;

(l) 5-dodecylsulfonyl-2-(2-hydroxy-3,5-di-tert-butylphenyl)-2H-benzotriazole;

(m) 5-octylsulfonyl-2-(2-hydroxy-3,5-di-tert-octylphenyl)-2H-benzotriazole;

(n) 5-trifluoromethyl-2-(2-hydroxy-3-α-cumyl-5-tert-butylphenyl)-2H-benzotriazole;

(o) 5-trifluoromethyl-2-(2-hydroxy-3-α-cumyl-5-nonylphenyl)-2H-benzotriazole;

(p) 5-trifluoromethyl-2-[2-hydroxy-3-α-cumyl-5-(2-hydroxyethyl)phenyl]-2H-benzotriazole;

(q) 5-trifluoromethyl-2-[2-hydroxy-3-α-cumyl-5-(3-hydroxypropyl)phenyl]-2H-benzotriazole;

(r) 5-trifluoromethyl-2-(2-hydroxy-3,5-di-tert-amylphenyl)-2H-benzotriazole;

(s) 5-trifluoromethyl-2-(2-hydroxy-3,5-di-tert-butylphenyl)-2H-benzotriazole;

(t) 5-trifluoromethyl-2-(2-hydroxy-3-dodecyl-5-methylphenyl)-2H-benzotriazole;

(u) 5-trifluoromethyl-2-[2-hydroxy-3-tert-butyl-5-(3-hydroxypropyl)phenyl]-2H-benzotriazole;

(v) 5-trifluoromethyl-2-[2-hydroxy-3-tert-butyl-5-(2-hydroxyethyl)phenyl]-2H-benzotriazole;

(w) 5-trifluoromethyl-2-[2-hydroxy-5-(2-hydroxyethyl)phenyl]-2H-benzotriazole;

(x) 5-trifluoromethyl-2-(2-hydroxy-3,5-di-α-cumylphenyl)-2H-benzotriazole;

(y) 5-fluoro-2-(2-hydroxy-3,5-di-α-cumylphenyl)-2H-benzotriazole;

(z) 5-butylsulfonyl-2-(2-hydroxy-3,5-di-α-cumylphenyl)-2H-benzotriazole;

(aa) 5-butylsulfonyl-2-(2-hydroxy-3,5-di-tert-butylphenyl)-2H-benzotriazole;
(bb) 5-butylsulfonyl-2-(2-hydroxy-3,5-di-tert-octylphenyl)-2H-benzotriazole;
(cc) 5-phenylsulfonyl-2-(2-hydroxy-3,5-di-tert-butylphenyl)-2H-benzotriazole;
(dd) 5-chloro-2-(2-hydroxy-3,5-di-α-cumylphenyl)-2H-benzotriazole;
(ee) 5-chloro-2-(2-hydroxy-3-α-cumyl-5-tert-octylphenyl)-2H-benzotriazole;
(ff) isooctyl 3-(5-chloro-2H-benzotriazol-2-yl)-5-tert-butyl-4-hydroxyhydrocinnamate; and
(gg) 2-(2-hydroxy-3-α-cumyl-5-tert-octylphenyl)-2H-benzotriazole.

3. A method according to claim 2 wherein said benzotriazole UV absorbers are selected from the group consisting of
(a) 5-trifluoromethyl-2-(2-hydroxy-3-α-cumyl-5-tert-octylphenyl)-2H-benzotriazole;
(b) 5-trifluoromethyl-2-(2-hydroxy-5-tert-octylphenyl)-2H-benzotriazole;
(c) 5-trifluoromethyl-2-(2-hydroxy-3,5-di-tert-octylphenyl)-2H-benzotriazole;
(g) methyl 3-(5-trifluoromethyl-2H-benzotriazol-2-yl)-5-tert-butyl-4-hydroxyhydrocinnamate;
(j) 5-butylsulfonyl-2-(2-hydroxy-3-α-cumyl-5-tert-octylphenyl)-2H-benzotriazole;
(n) 5-trifluoromethyl-2-(2-hydroxy-3-α-cumyl-5-tert-butylphenyl)-2H-benzotriazole;
(s) 5-trifluoromethyl-2-(2-hydroxy-3,5-di-tert-butylphenyl)-2H-benzotriazole;
(x) 5-trifluoromethyl-2-(2-hydroxy-3,5-di-α-cumylphenyl)-2H-benzotriazole;
(aa) 5-butylsulfonyl-2-(2-hydroxy-3,5-di-tert-butylphenyl)-2H-benzotriazole; and
(cc) 5-phenylsulfonyl-2-(2-hydroxy-3,5-di-tert-butylphenyl)-2H-benzotriazole.

4. A method according to claim 1 wherein said container comprises at least one hydroxyphenyl benzotriazole UV absorber and at least one further UV absorber selected from the group consisting of the tris-aryl-s-triazine UV absorbers, or which comprises a mixture of two or more hydroxyphenyl benzotriazole UV absorbers.

5. A method according to claim 1 wherein said container additionally comprises at least one UV absorber selected from the group consisting of 2-(2-hydroxy-3,5-di-α-cumyl)-2H-benzotriazole, 5-chloro-2-(2-hydroxy-3-tert-butyl-5-methylphenyl)-2H-benzotriazole, 5-chloro-2-(2-hydroxy-3,5-di-tert-butylphenyl)-2H-benzotriazole and 4,6-diphenyl-2-(4-hexyloxy-2-hydroxyphenyl)-s-triazine.

6. A method according to claim 1 in which said contents are selected from the group consisting of fruit juices, soft drinks, beer, wines, meats, vegetables, food products, dairy products, personal care products, cosmetics, shampoos, vitamins, pharmaceuticals, inks, dyes and pigments.

7. A method according to claim 1 wherein said container is a mono- or multi-layered container
wherein each layer is comprised of one or more polymers selected from the group consisting of polyesters, polyolefins, polyolefin copolymers, polyethylene-vinyl acetate, polystyrene, poly(vinyl chloride), poly (vinylidene chloride), polyamides, cellulosics, polycarbonates, polyethylene-vinyl alcohol, poly(vinyl alcohol), poly(vinyl alcohol) copolymers, polystyrene-acrylonitrile, ionomers, partially hydrolyzed poly(vinyl acetate), poly(ethylene-co-vinyl alcohol), polyvinylidene chloride, polyurethanes, polyvinylidene chloride and polyepoxies.

8. A method according to claim 7 in which at least one layer is comprised of a polymer selected from the group consisting of poly(ethylene terephthalate), polyethylene and polypropylene.

9. A method according to claim 7 wherein the UV absorbers are incorporated into a coating applied to the outer surface of the container.

10. A method according to claim 1 in which the UV absorbers are present from about 0.1 to about 20% by weight based on the weight of the plastic container.

11. A method according to claim 1 where the container additionally comprises at least one coadditive selected from the group consisting of antioxidants, other UV absorbers, hindered amines, phosphites or phosphonites, hydroxylamines, nitrones, benzofuran-2-ones, thiosynergists, polyamide stabilizers, metal stearates, nucleating agents, fillers, reinforcing agents, lubricants, emulsifiers, dyes, pigments, optical brighteners, flame retardants, antistatic agents and blowing agents.

12. A method according to claim 2 wherein said container comprises at least one hydroxyphenyl benzotriazole UV absorber and at least one further UV absorber selected from the group consisting of the tris-aryl-s-triazine UV absorbers, or which comprises a mixture of two or more hydroxyphenyl benzotriazole UV absorbers.

13. A method according to claim 2 wherein said container additionally comprises at least one UV absorber selected from the group consisting of 2-(2-hydroxy-3,5-di-α-cumyl)-2H-benzotriazole, 5-chloro-2-(2-hydroxy-3-tert-butyl-5-methylphenyl)-2H-benzotriazole, 5-chloro-2-(2-hydroxy-3,5-di-tert-butylphenyl)-2H-benzotriazole and 4,6-diphenyl-2-(4-hexyloxy-2-hydroxyphenyl)-s-triazine.

14. A method according to claim 2 in which said contents are selected from the group consisting of fruit juices, soft drinks, beer, wines, meats, vegetables, food products, dairy products, personal care products, cosmetics, shampoos, vitamins, pharmaceuticals, inks, dyes and pigments.

15. A method according to claim 2 wherein said container is a mono- or multi-layered container
wherein each layer is comprised of one or more polymers selected from the group consisting of polyesters, polyolefins, polyolefin copolymers, polyethylene-vinyl acetate, polystyrene, poly(vinyl chloride), poly (vinylidene chloride), polyamides, cellulosics, polycarbonates, polyethylene-vinyl alcohol, poly(vinyl alcohol), poly(vinyl alcohol) copolymers, polystyrene-acrylonitrile, ionomers, partially hydrolyzed poly(vinyl acetate), poly(ethylene-co-vinyl alcohol), polyvinylidene chloride, polyurethanes, polyvinylidene chloride and polyepoxies.

16. A method according to claim 15 in which at least one layer is comprised of a polymer selected from the group consisting of poly(ethylene terephthalate), polyethylene and polypropylene.

17. A method according to claim 15 wherein the UV absorbers are incorporated into a coating applied to the outer surface of the container.

* * * * *